US009076204B2

(12) United States Patent
Ogura et al.

(10) Patent No.: US 9,076,204 B2
(45) Date of Patent: Jul. 7, 2015

(54) IMAGE CAPTURING DEVICE, IMAGE CAPTURING METHOD, PROGRAM, AND INTEGRATED CIRCUIT

(75) Inventors: Yasunobu Ogura, Osaka (JP); Pongsak Lasang, Singapore (SG); Sheng Mei Shen, Singapore (SG)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 119 days.

(21) Appl. No.: 13/520,257

(22) PCT Filed: Nov. 7, 2011

(86) PCT No.: PCT/JP2011/006185
§ 371 (c)(1),
(2), (4) Date: Jul. 2, 2012

(87) PCT Pub. No.: WO2012/063449
PCT Pub. Date: May 18, 2012

(65) Prior Publication Data
US 2012/0281132 A1  Nov. 8, 2012

(30) Foreign Application Priority Data

Nov. 8, 2010 (JP) ................................. 2010-250229

(51) Int. Cl.
*G06T 5/00* (2006.01)
*H04N 5/232* (2006.01)
*G06T 5/50* (2006.01)

(52) U.S. Cl.
CPC ............ *G06T 5/003* (2013.01); *H04N 5/23212* (2013.01); *G06T 5/50* (2013.01); *G06T 2207/10148* (2013.01); *G06T 2207/20221* (2013.01)

(58) Field of Classification Search
CPC ... H04N 13/04; H04N 13/02; H04N 5/23212; G06T 2207/20221; G06T 2207/10148; G06T 2207/10141; G06T 2207/10144; G06T 2207/20212; G06T 2207/20216; G06T 2207/20228; G06T 2207/20224
USPC .................................. 348/135–142, 345–357
See application file for complete search history.

(56) References Cited

U.S. PATENT DOCUMENTS 5,124,842 A   6/1992  Honda et al.
5,148,502 A   9/1992  Tsujiuchi et al.
(Continued)

FOREIGN PATENT DOCUMENTS

JP    1-309478    12/1989
JP    5-313068    11/1993
(Continued)

OTHER PUBLICATIONS

International Search Report issued Feb. 7, 2012 in International (PCT) Application No. PCT/JP2011/006185.
(Continued)

*Primary Examiner* — Pritham Prabhakher
(74) *Attorney, Agent, or Firm* — Wenderoth, Lind & Ponack, L.L.P.

(57) ABSTRACT

An image capturing device includes: a pre-capturing module which captures an imaging target at each of different focus positions in a predetermined focus range and outputs, as a capturing result, a plurality of pre-captured images lower in resolution than the output image; an object sharpness evaluating module which computes a sharpness level of each of the pre-captured images captured by the pre-capturing module; a focus varying range determining module which determines a focus position varying range within the predetermined focus range based on sharpness levels computed by the object sharpness evaluating module, such that a signal-to-noise ratio of the output image is greater than or equal to a predetermined threshold; and an image capturing module which captures the imaging target while varying the focus position according to the focus position varying range determined by the focus varying range determining module, and outputs the output image as a capturing result.

10 Claims, 17 Drawing Sheets

(56) References Cited

U.S. PATENT DOCUMENTS

| | | |
|---|---|---|
| 6,201,899 B1 | 3/2001 | Bergen |
| 7,711,259 B2 | 5/2010 | Daley |
| 7,995,116 B2* | 8/2011 | Pillman et al. ............. 348/229.1 |
| 8,472,744 B2* | 6/2013 | Hong ............................ 382/255 |
| 2008/0013941 A1 | 1/2008 | Daley |
| 2008/0239136 A1* | 10/2008 | Kanai et al. ................... 348/340 |
| 2009/0167923 A1* | 7/2009 | Safaee-Rad et al. .......... 348/345 |
| 2009/0167930 A1* | 7/2009 | Safaee-Rad et al. .......... 348/347 |
| 2009/0297056 A1* | 12/2009 | Lelescu et al. ................. 382/261 |
| 2010/0128144 A1* | 5/2010 | Tay ............................ 348/229.1 |
| 2010/0171837 A1* | 7/2010 | Pillman et al. ................ 348/187 |
| 2010/0272356 A1* | 10/2010 | Hong ............................ 382/170 |
| 2010/0303373 A1* | 12/2010 | Keelan et al. ................. 382/255 |

FOREIGN PATENT DOCUMENTS

| | | |
|---|---|---|
| JP | 2006-154322 | 6/2006 |
| JP | 2008-13941 | 1/2008 |
| JP | 2010-91169 | 4/2010 |
| JP | 2012-5063 | 1/2012 |

OTHER PUBLICATIONS

Sujit Kuthirummal et al., "Flexible Depth of Field Photography", IEEE Transactions on Pattern Analysis and Machine Intelligence, vol. 99, Mar. 2010.

Rafael C. Gonzalez et al., "Digital Image Processing ", Addison-Wesley Publishing Company, Inc., 1992.

David S. C. Biggs et al., "Acceleration of Iterative Image Restoration Algorithms", Applied Optics, vol. 36, No. 8, Mar. 10, 1997.

Hajime Nagahara et al., "Flexible Depth of Field Photography", European Conference on Computer Vision (ECCV), Oct. 2008.

\* cited by examiner

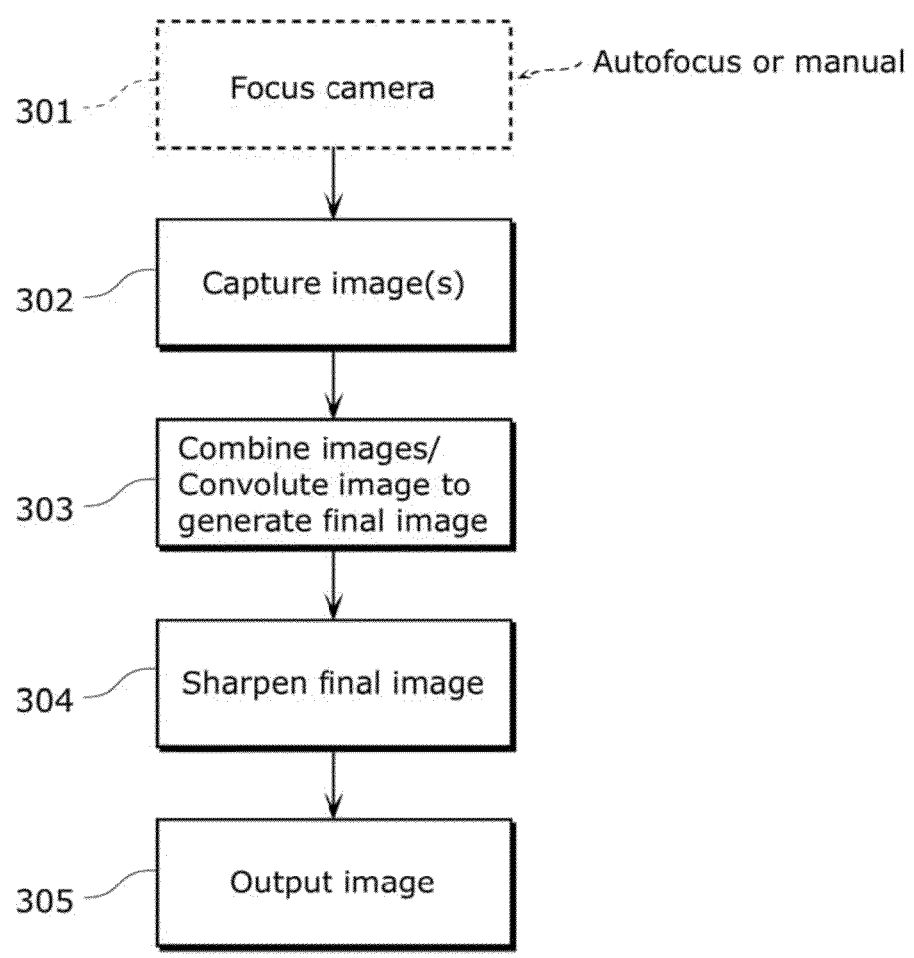

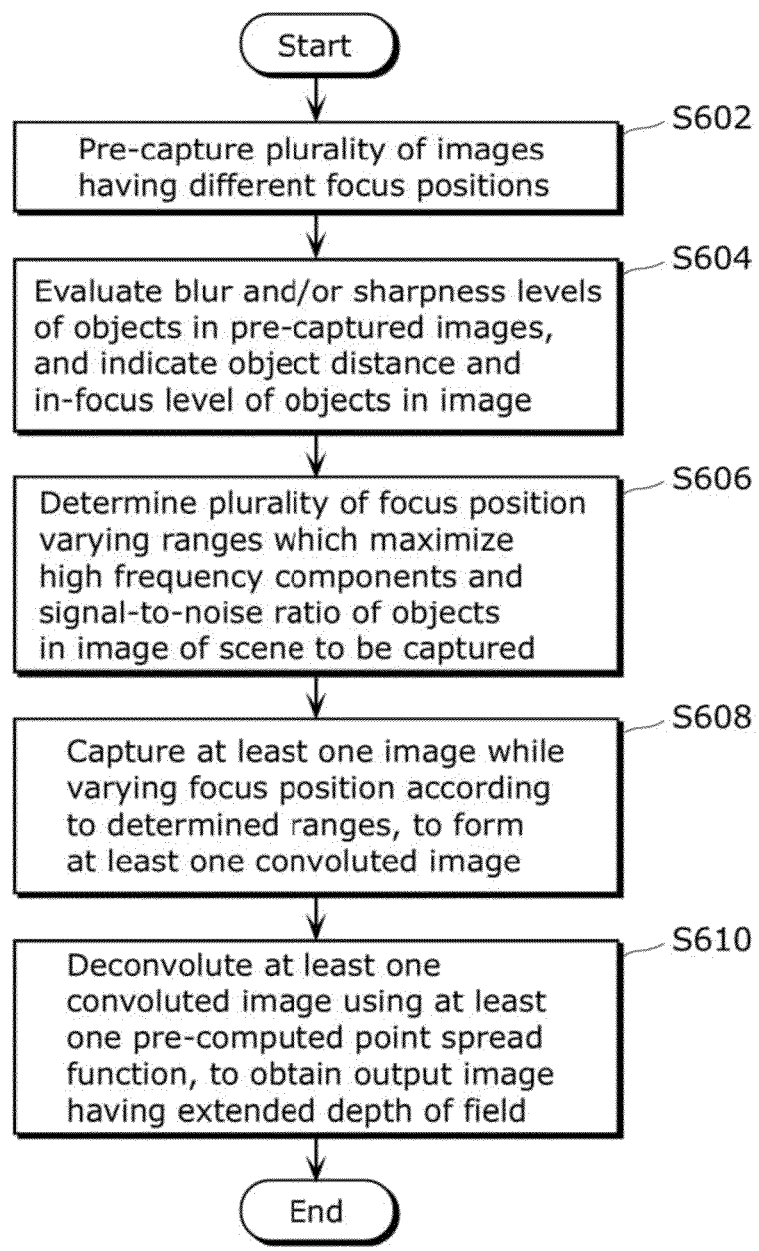

IMAGE CAPTURING DEVICE, IMAGE CAPTURING METHOD, PROGRAM, AND INTEGRATED CIRCUIT

BACKGROUND OF INVENTION

Technical Field

The present invention relates to image data processing. More specifically, the present invention relates to a method and a device for generating an image having an extended depth of field from at least one image captured while focus position is varied.

BACKGROUND ART

An image with a large depth of field is a relatively deep 3-dimensional (3D) image in which both relatively near and relatively far objects appear acceptably sharp (in-focus). A large depth of field is preferred in many situations. For example, in 3D applications of an image of a person standing in front of beautiful background scenery, it is preferable to see the image of both the person and the beautiful background scenery sharply in 3D (i.e. stereoscopic 3D). This allows the viewer to sharply see the 3D image both in the case of seeing the person at the front and in the case of seeing the beautiful background scenery.

Conventionally, a simple method for increasing the depth of field is achieved by increasing F-number of aperture (reducing the aperture diameter) of an image capturing device. However, it reduces the amount of incoming light to be captured. This causes the captured image in particular to appear noisy, and slower shutter speed may cause hand shaking and object blur in some cases.

Methods for increasing the depth of field are disclosed in Patent Literatures 1 and 2 below. Patent Literature 1 (the specification of U.S. Pat. No. 6,201,899, issued on Mar. 13, 2001) discloses a method and an apparatus for extended depth of field imaging. This method uses multiple source images, captured at different focus positions, to combine into a single image. Referring to FIG. 2, this method receives multiple source images ($I_1$ to $I_M$) captured at different focus positions. High pass filter is applied to each source image to obtain relatively high frequency components. Then, the method computes energy levels of the high frequency components for each source image and selects multiple sub-regions having greatest energy levels. An extended depth of field image is finally constructed by combining sub-regions corresponding to the source images having greatest energy levels of high frequency components.

The method, however, requires that the complete multiple source images be received before the image constructing can start. Thus, to obtain an extended depth of field image using this method, the above requirement often results in a time lag of at least equal to a time required for capturing multiple source images. Such a time lag is unacceptable in situations where real-time operation is desired for obtaining an extended depth of field image. Moreover, the method generally requires a huge memory for storing the source images and the filtered images, especially in the case of using high resolution source images.

Patent Literature 2 (the specification of U.S. Pat. No. 7,711,259, issued on May 4, 2010) discloses a method and an apparatus for increasing the depth of field of an image. Referring to FIG. 3, this method captures multiple images at different focus positions and combines the captured images to form a final image. Then the method sharpens the final image to construct an output image having an improved depth of field. The method, however, is also deficient in that multiple images are used. That is to say, a time lag may occur. This method is thus not suitable for real-time application.

In another embodiment of Patent Literature 2, another method is also proposed. This method captures only one image while varying the focus position during image capturing, to form a final image. Then the method sharpens the final image to construct an image having an improved depth of field. The range of varying the focus position can be set manually by the user or predefined in the camera. This method is therefore not fully automatic and it is difficult for an average user to adjust the range. Moreover, this method is not suitable when the scene to be captured is unknown or unpredictable.

Furthermore, Non-Patent Literature 1 ("Flexible Depth of Field Photography", S. Kuthirummal, H. Nagahara, C. Zhou, and S. K. Nayar, IEEE Transactions on Pattern Analysis and Machine Intelligence, Vol. 99, March, 2010) discloses a method to capture one image while varying the focus position during image capturing. These known methods predetermine the range of varying the focus position. Referring to FIG. 1, some of the known methods always start the image capturing (open the shutter) by focusing at $Z_1$ and move the focus position to $Z_3$ before stopping the image capturing (close the shutter). This method is suitable when the scene is known beforehand or the image capturing environment is known, such as in the case of image capturing using an electronic microscope, where the distance from the camera to the subject is known. However, these methods are not suitable when the type of scene to be captured is unknown or unpredictable.

CITATION LIST

Patent Literature

[PTL 1] Specification of U.S. Pat. No. 6,201,899
[PTL 2] Specification of U.S. Pat. No. 7,711,259

Non Patent Literature

[NPL 1] "Flexible Depth of Field Photography", S. Kuthirummal, H. Nagahara, C. Zhou, and S. K. Nayar, IEEE Transactions on Pattern Analysis and Machine Intelligence, Vol. 99, March, 2010
[NPL 2] "Digital Image Processing", R. C. Gonzalez & R. E. Woods, Addison-Wesley Publishing Company, Inc., 1992
[NPL 3] "Acceleration of Iterative Image Restoration Algorithms", D. S. C. Biggs, Applied Optics, Vol. 36, No. 8, pp. 1766-1775, 1997

SUMMARY OF INVENTION

It is an object of the present invention to provide a method and a device for extending the depth of field of an image of a scene. In particular, it is an object of the present invention to provide a method and a device that are efficient, use less memory, have no significant time lag, capable of real-time operation, and capable of automatically producing a sharp image for various scene types even when the scene to be captured is unknown and unpredictable.

To achieve the above objects, an information processing device according to an aspect of the present invention is an image capturing device which captures an imaging target while varying a focus position and outputs at least one output image as a capturing result, the image capturing device including: a pre-capturing unit configured to capture the imaging target at each of different focus positions in a predetermined focus range and output, as a capturing result, a plurality of pre-captured images lower in resolution than the output image; a sharpness level computing unit configured to compute a sharpness level of each of the pre-captured images captured by the pre-capturing unit; a focus varying range determining unit configured to determine a focus position varying range within the predetermined focus range based on sharpness levels computed by the sharpness level computing unit, such that a signal-to-noise ratio of the output image is greater than or equal to a predetermined threshold; and an image capturing unit configured to capture the imaging target while varying the focus position according to the focus position varying range determined by the focus varying range determining unit, and output the at least one output image as a capturing result.

Here, it is preferable that the image capturing device further include an extended depth of field image deriving unit configured to derive an extended depth of field image having an extended depth of field, using the at least one output image outputted by the image capturing unit and at least one predetermined point spread function.

With this, before the imaging target is actually captured to generate an output image, pre-captured images are obtained by capturing the imaging target plural times, each time with a different focus position, and the sharpness levels of the pre-captured images are evaluated. Thus, since the sharpness levels of the pre-captured images captured at the plural focus positions are evaluated in advance, the position, relative to the image capturing device, of an object in the scene which is the imaging target can be known. With this, the focus varying range determining unit can automatically determine a focus position varying range such that the range includes the focus position of each object at which the object can be captured sharply in the scene to be captured, for example.

As described, since, prior to actual image capturing, a focus position varying range is automatically determined according to the scene to be captured, it is unnecessary for the user to manually adjust the focus position varying range to suit the scene. This allows the user to easily operate the image capturing device with less confusion about how to operate the device. Therefore, a high-quality, sharp, and clear image with an extended depth of field can be obtained for various scene types even when the position, relative to the image capturing device, of an object in the scene to be captured is unknown.

Moreover, the pre-captured images obtained to determine a focus position varying range are lower in resolution than an output image, and thus fewer high resolution images need to be used and stored. Therefore, fewer memories are required than the conventional technique disclosed in Patent Literature 1. Moreover, the present invention has shorter time lags and is capable of real-time applications.

Here, it is preferable that the focus varying range determining unit be configured to: obtain, for each pre-captured image, a sharpness level of each of regions obtained by dividing each pre-captured image; compare the sharpness levels between the pre-captured images for each region; obtain, for each region, a focus position corresponding to a pre-captured image having a maximum sharpness level among the sharpness levels of the regions obtained for each pre-captured image; and determine the focus position varying range such that the obtained focus positions are included.

With this, the focus varying range determining unit obtains, for each pre-captured image, a sharpness level of each of regions obtained by dividing each pre-captured image, and obtains, for each region, a focus position corresponding to a pre-captured image having a maximum sharpness level among the sharpness levels of the regions obtained for each pre-captured image. Then, the focus varying range determining unit determines the focus position varying range such that the obtained focus positions are included.

Thus, for each region, a focus position corresponding to the pre-captured image having the maximum sharpness level is obtained, and a focus position varying range is determined based on the focus positions obtained. With this, in the case where an object is present in a region obtained by dividing each pre-captured image, the focus position corresponding to that object can be obtained. In other words, because a focus position varying range is determined such that the obtained focus positions are included, it is possible to obtain an image in which each object included in the scene to be captured appears sharply.

Here, it is also possible that the focus varying range determining unit is configured to: obtain, for each pre-captured image, a sharpness level of each of regions obtained by dividing each pre-captured image; obtain a plurality of focus positions at which pre-captured images having, among the obtained sharpness levels of the pre-captured images and the regions, sharpness levels higher than a predetermined threshold have been captured; and determine the focus position varying range such that the obtained focus positions are included.

With this, the focus varying range determining unit obtains, for each pre-captured image, a sharpness level of each of regions obtained by dividing each pre-captured image, and obtains a plurality of focus positions at which pre-captured images having, among the sharpness levels obtained for each pre-captured image and each region, sharpness levels higher than a predetermined threshold have been captured. Then, the focus varying range determining unit determines a focus position varying range such that the obtained focus positions are included.

With this, the focus position varying range is determined such that the range includes the focus positions at which the pre-captured images having sharpness levels higher than at least a predetermined threshold have been captured. More specifically, since the focus positions corresponding to the objects having higher sharpness levels can be obtained, a range, in the scene to be captured, in which an image can be captured with a higher sharpness level can be set as the focus position varying range. As a result, a sharp image can be obtained.

Here, it is preferable that the focus varying range determining unit be configured to determine the focus position varying range by determining, among the obtained focus positions, a nearest position as a start point and a farthest position as an end point.

Here, it is also possible that the focus varying range determining unit is configured to determine a plurality of focus position varying ranges by determining, in each of focus position groups, a nearest position as a start point and a farthest position as an end point, the focus position groups each including, among the obtained focus positions, focus positions satisfying predetermined consecutiveness.

Here, it is preferable that the image capturing unit be configured to: adjust an exposure time based on a size of the determined focus position varying range so as to prevent saturation of pixels of an image to be captured; and capture the imaging target within the adjusted exposure time while varying the focus position according to the focus position varying range.

With this, the exposure time is adjusted according to the size of the focus position varying range so as to prevent pixel saturation, thereby allowing capturing of the imaging target with as many light signals as possible. In other words, a shape, high-quality, and clear image can be obtained.

Here, it is preferable that the focus position varying range be limited by a predetermined exposure time.

With this, the focus position varying range is limited according to a predetermined exposure time, and thus, it is effective when the amount of light is large, for example.

Here, it is preferable that: the image capturing device further include (i) an object detecting unit configured to detect an object in the imaging target; and (ii) an object region identifying unit configured to identify, based on the detected object, an object region that is a partial region of an image obtained by capturing the imaging target such that the detected object is at the center of the image; and that the focus varying range determining unit be configured to determine the focus position varying range such that a signal-to-noise ratio of the detected object is maximized, based on the object region identified by the object region identifying unit.

With this, identification of the object region enables evaluation of pre-captured images focusing on the object region, thereby allowing the focus varying range determining unit to determine the focus position varying range. This decreases the data amount required for the evaluation, thereby reducing the time required for determining the focus position varying range.

Here, it is preferable that: the image capturing device further include a selection receiving unit configured to receive, from a user, selection of a region of the imaging target in which an object is to be captured; and the object region identifying unit be configured to identify the object region based on the selection of the region received by the selection receiving unit.

With this, an image with a high sharpness level for at least the object of the user's interest can be obtained because the object region is recognized based on information given by the user.

Furthermore, the present invention can, not only be realized as such an image capturing device, but also as an image capturing method to be implemented in an image capturing device. The present invention can also be realized as a program which causes a computer to execute the image capturing method. Such a program can be distributed via a recording medium such as a CD-ROM or a transmission medium such as the Internet. Furthermore, the present invention can be realized as an integrated circuit which performs processing of each processing unit.

Advantageous Effects of Invention

An advantageous effect of the present invention is that a focus position varying range is automatically determined according to a scene prior to actual image capturing. It is unnecessary for the user to manually adjust the focus position varying range. This allows the user to easily operate the device with less confusion. The present invention attempts to maximize high frequency components and signal-to-noise ratio of an object in an image and appropriately determines a focus position varying range based on the scene.

Therefore, a high-quality, sharp, and clear image having an extended depth of field can be obtained for various scene types even when the scene to be captured is unknown, and thus the present invention has an effect which is advantageous over the conventional technique disclosed in Patent Literature 2 and other known methods.

Another advantageous effect of the present invention is that fewer high resolution images are used and stored. The present invention therefore requires fewer memories than the conventional technique disclosed in Patent Literature 1. Moreover, the present invention has shorter time lags and is capable for real-time applications.

BRIEF DESCRIPTION OF DRAWINGS

FIG. 3 is a flow diagram of another conventional method implemented by an image capturing device for increasing the depth of field.

FIG. 6B is a flowchart of a depth of field extending process according to an embodiment of the present invention.

DETAILED DESCRIPTION OF INVENTION

Hereinafter, embodiments of the present invention will be described in detail with accompanying drawings. Note that the embodiments described below are preferable, specific examples of the present invention. The structural elements, the arrangement and connection of the structural elements, the operation orders, and so on shown in the following embodiments are given by way of example and are not intended to limit the present invention. The present invention is limited only by the claims. Therefore, among the structural elements described in the embodiments below, those not recited in the independent claims indicating the most generic concept of the present invention are not essential for achieving the objects of the present invention but are described as preferable structural elements.

The present invention provides an image capturing device and an image capturing method for extending the depth of field of an image of a scene. In the present invention, at least one image is captured while the focus position is varied. A focus position varying range is automatically and adaptively determined based on the scene to be captured. The scene is then captured while the focus position is varied according to the determined focus position varying range, and at least one output image is outputted. According to the present invention, the focus position varying range is determined to maximize the signal-to-noise ratio of an object in the output image. Therefore, a high-quality, sharp, and clear image having an extended depth of field can be obtained for various scene types.

Figure 1:
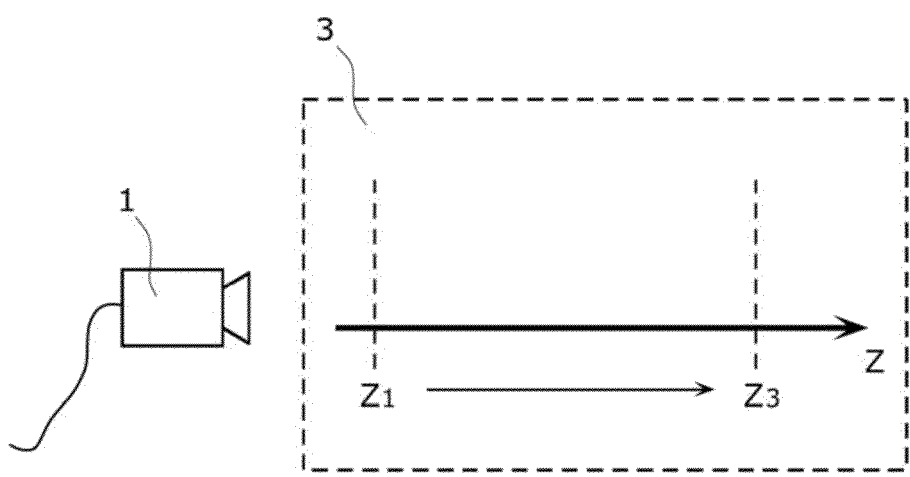
FIG. 1 shows an image capturing method according to a conventional technique.
Figure 2:
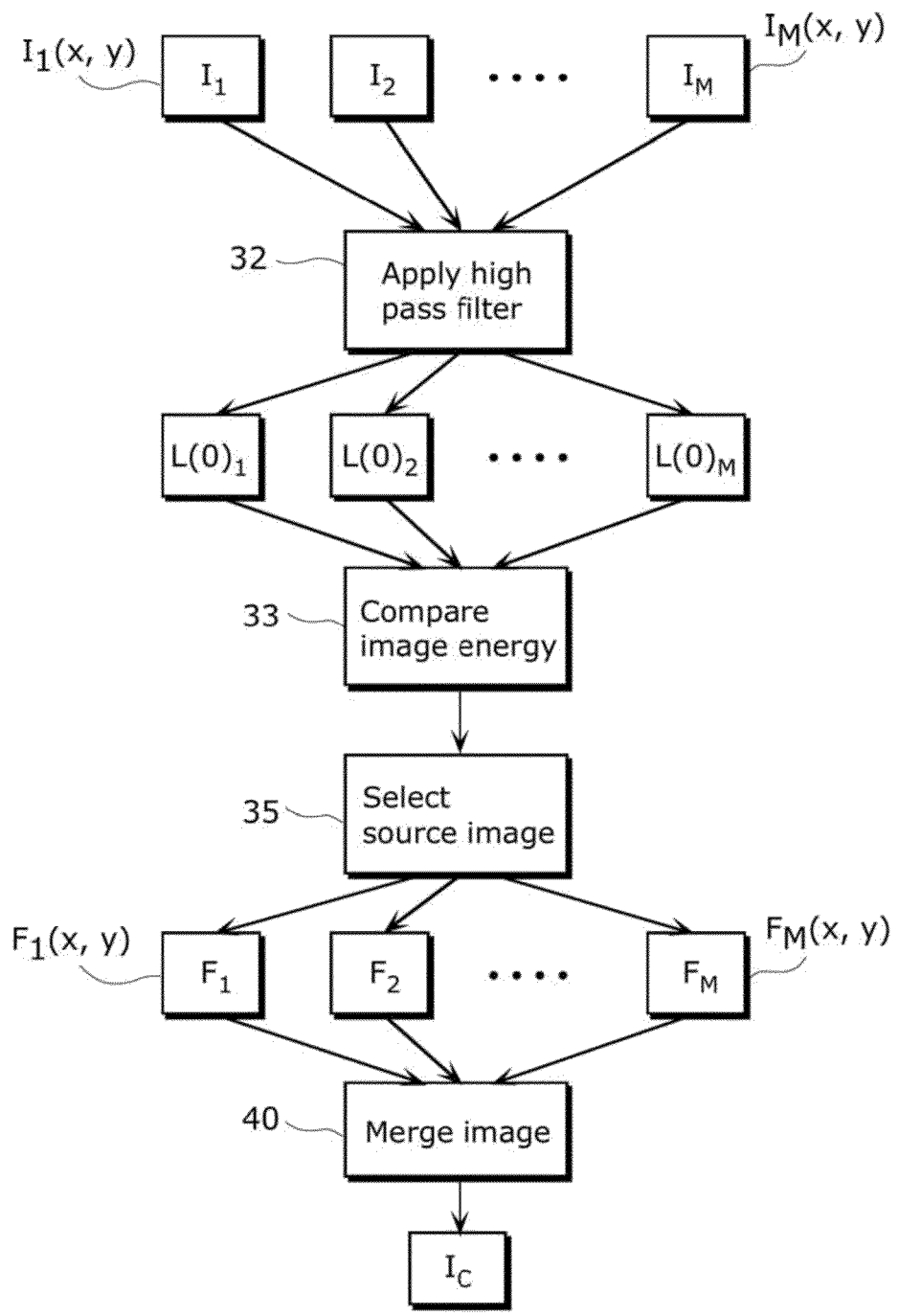
FIG. 2 is a flow diagram of a conventional method for constructing an image with an extended depth of field.
Figure 4A:
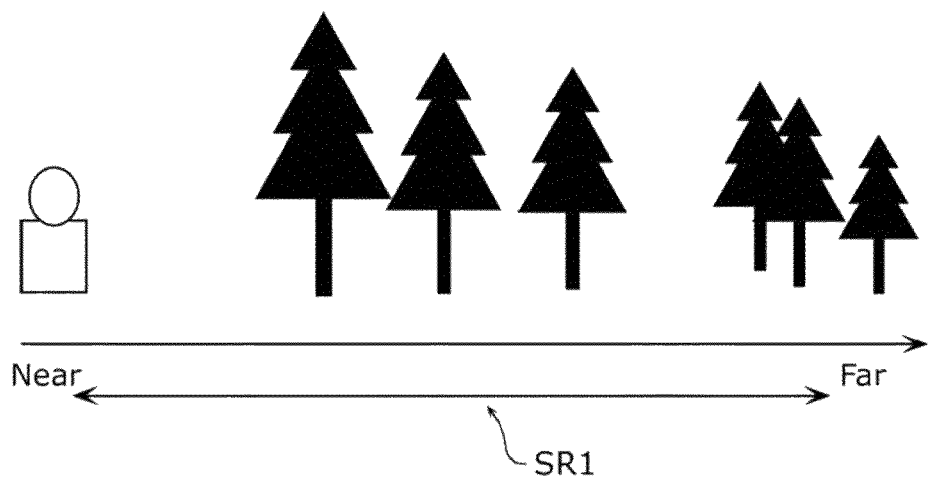
FIG. 4A is an illustrative example of two different capturing scenarios of one scene.

FIG. 4A shows an example of a scene to be captured as an imaging target in which there are many objects. The relatively near object is close to the image capturing device and the relatively far object is distant from the image capturing device, and there are a plurality of objects in between. In order to obtain an image having a large depth of field for all objects, image capturing is performed while the focus position of the image capturing device is varied from the near objects to the far objects, so that high frequency components of all objects are embedded into the captured image. Here, for example, the "focus position varying range" for this scene is set to SR1, starting from a focus position at which the object nearest to the image capturing device is in focus, to a focus position at which the object farthest to the image capturing device is in focus.

Figure 4B:
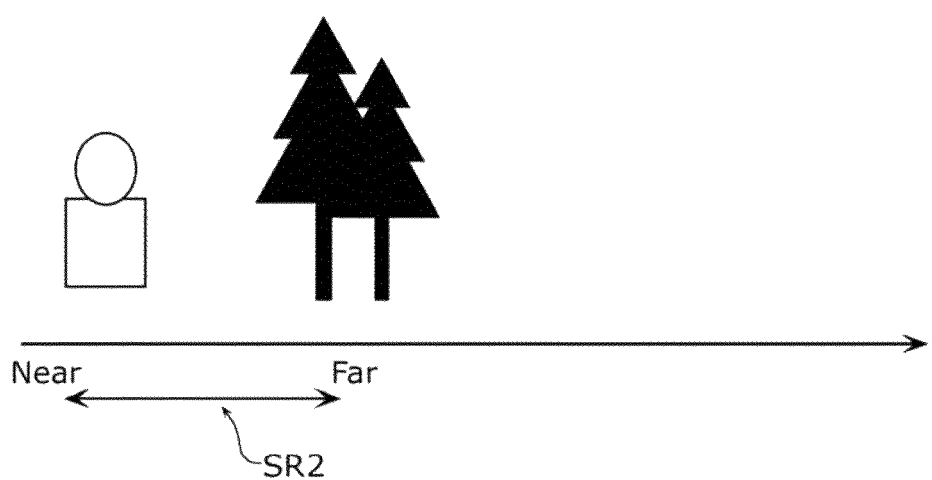
FIG. 4B is an illustrative example of two different capturing scenarios of one scene.

FIG. 4B shows another example of capturing a scene in which there are only near objects. The focus position varying range for this scene should be adaptively determined to be different to the focus position varying range SR1 shown in FIG. 4A. For example, the focus position varying range is set to a focus position varying range SR2, which is smaller than SR1. With the focus position varying range SR2, the objects shown in FIG. 4B are closer to the image capturing device than the objects shown in FIG. 4A. In other words, the object farthest from the image capturing device in FIG. 4B is closer to the image capturing device than the object farthest from the image capturing device in FIG. 4A is. The focus position varying range is changed according to the distribution of the positions of the objects in the scene relative to the image capturing device, so as to include at least the focus position of each object, and thus useful information (high frequency components) of the objects is embedded into the captured image.

Conversely, in the case where the focus position varying range is fixed or predefined, unnecessary information (such as blur) is sometimes captured. For example, in the case where the focus position varying range is predefined as SR1, it may not be suitable to use SR1 for the scene in FIG. 4B. This is because after the focus position is moved pass a first object (person) and a second object (trees), the image capturing continues even though there are no other objects to be captured in focus, and only blur information of the first and second objects is captured when the focus position is varied beyond the focus position varying range SR2. As described above, in the case where the blur information of the first and second objects is captured, the image quality and object sharpness level of the output image may be affected. On the other hand, in the case where the focus position varying range SR2 is used for the scene in FIG. 4B, the most useful information (high frequency components) of the objects is captured, and blur information of the objects is captured in as little amount as possible. Thus, in the case of capturing the scene in FIG. 4B at a given exposure time, the image captured using the focus position varying range SR2 has a higher signal-to-noise ratio than the image captured using the focus position varying range SR1. As described, because the focus position varying range SR2 is smaller, varying of the focus position can be slower within a given capturing time. This allows a longer exposure time.

Figure 5A:
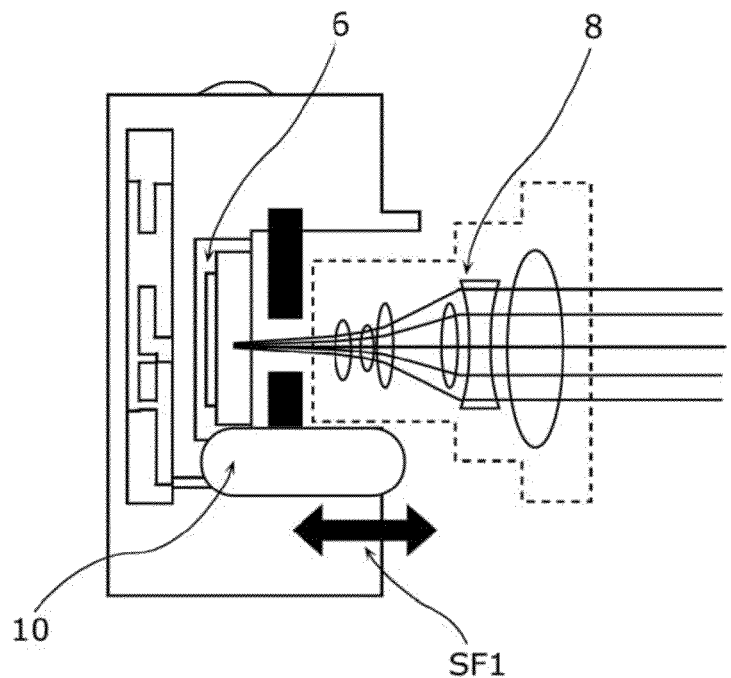
FIG. 5A shows an image capturing device according to an embodiment of the present invention.
Figure 5B:
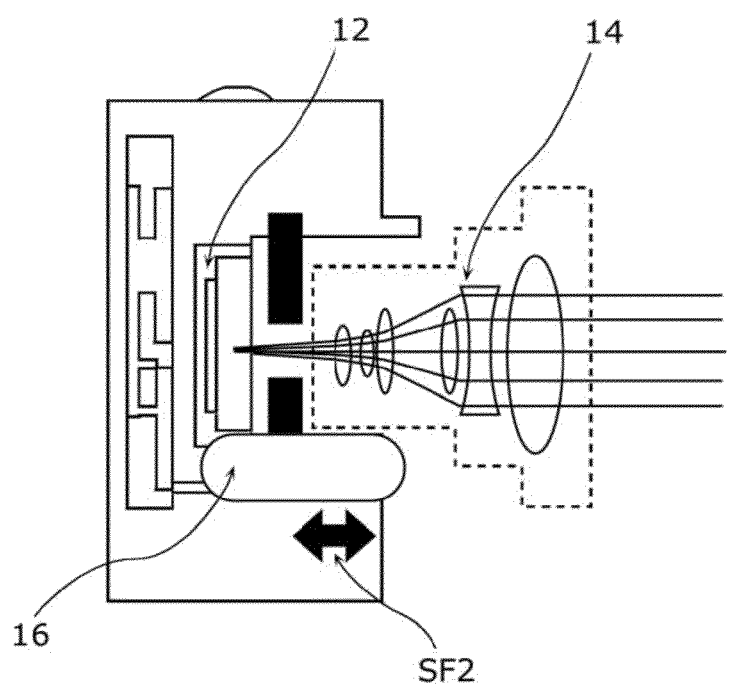
FIG. 5B shows an image capturing device according to an embodiment of the present invention.

By adaptively changing the focus position varying range based on the scene, a high-quality output image can be obtained for various scene types. The present invention makes it possible to vary the focus position by moving an imaging lens or an image sensor or both. FIG. 5A and FIG. 5B show an image capturing device 600 according to an embodiment of the present invention. The image capturing device 600 includes an image sensor 6 (12), imaging lenses 8 (14), and an actuator 10 (16). The actuator 10 (16) moves the image sensor 6 (12) or the imaging lenses 8 (14) or both. The actuator 10 (16) is realized by a linear motor, a step motor, a servo controlled system, a piezoelectric element, or a micro electro mechanical system (MEMS). It is preferable that the actuator 10 (16) be a high-speed and high-accuracy actuator. The image capturing device 600 according to an embodiment of the present invention directs the actuator 10 (16) to move at least the image sensor 6 (12) or the imaging lenses 8 (14) with a large range SF1 or a range SF2 smaller than SF1 according to the scene, so as to capture an image while changing the focus position varying range according to the scene. Note that the focus position varying range is automatically determined. The details will be described next.

Figure 6A:
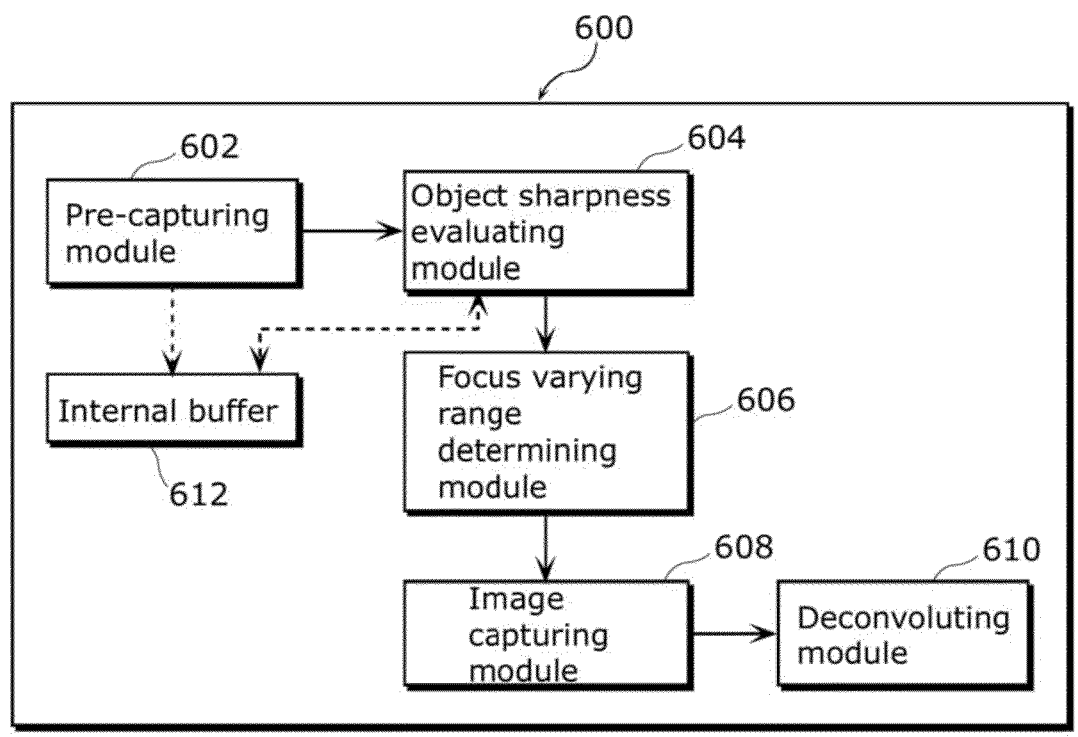
FIG. 6A is a block diagram of a device for extending the depth of field according to an embodiment of the present invention.

FIG. 6A is a block diagram of the image capturing device 600 for extending the depth of field of an image according to an embodiment of the present invention. The image capturing device 600 includes a pre-capturing module 602, an object sharpness evaluating module 604, a focus varying range determining module 606, an image capturing module 608, a deconvoluting module 610, and an internal buffer 612.

The pre-capturing module 602, functioning as a pre-capturing unit, captures a scene that is an imaging target at each of different focus positions, and outputs a plurality of pre-captured images which are lower in resolution than an output image to be finally outputted by the image capturing device 600 (see below). The pre-captured images outputted by the pre-capturing module 602 may be stored in the internal buffer 612 or be directly processed by the object sharpness evaluating module 604.

The object sharpness evaluating module 604 evaluates object sharpness levels of the plurality of pre-captured images. Note that the object sharpness evaluating module 604 may evaluate object blur instead of object sharpness level. Here, the object sharpness evaluating module 604 may evaluate the object sharpness level (or blur) such that the object sharpness level is higher as spatial frequency in a pre-captured image is higher, or evaluate that the object sharpness level is higher as the contrast is greater. This object sharpness evaluation results in indication of object in-focus levels of the pre-captured images. This evaluation is hereinafter described as "object in-focus level", but it is interchangeable with "object sharpness level" and "object blur". Note that in the case of interchanging with "object blur", the magnitude of the "object in-focus level" should be reversed. The evaluation result may be stored in the internal buffer 612 or be directly processed by the focus varying range determining module 606.

The focus varying range determining module 606 appropriately determines a focus position varying range suitable for each scene to be captured. More specifically, the focus varying range determining module 606 determines a focus position varying range that maximizes a signal-to-noise ratio of objects in an output image of the scene to be finally outputted by the image capturing device 600. This determination is based on the object sharpness (or blur) evaluation result.

Note that the object sharpness evaluating module 604 and the focus varying range determining module 606 function as a focus varying range determining unit, and determine a focus position varying range based on the sharpness levels of the pre-captured images captured by the pre-capturing module 602 functioning as the pre-capturing unit, such that the signal-to-noise ratio of the output image is maximized.

The image capturing module 608, functioning as an image capturing unit, captures an imaging target while varying the focus position according to the focus position varying range determined by the object sharpness evaluating module 604 and the focus varying range determining module 606 functioning as the focus varying range determining unit, and outputs at least one output image. When capturing a scene that is an imaging target, the image capturing module 608 simultaneously starts varying of the focus position and capturing of at least one image. The focus position varied at this time is based on the focus position varying range determined. This results in generation of a convoluted image corresponding to the focus position varying range.

The deconvoluting module 610, functioning as an extended depth of field image deriving unit, derives an image having an extended depth of field, using at least one image outputted by the image capturing unit and at least one predetermined point spread function (PSF). More specifically, the deconvoluting module 610 uses at least one predetermined PSF to deconvolute a captured image (convoluted image) outputted by the image capturing module 608, to derive an image having an extended depth of field. The image having an extended depth of field outputted by the deconvoluting module 610 is also called an "all in-focus (AIF)" image, and may be used for viewing purpose. Alternatively, the AIF image may be used in further processing modules such as depth estimation and depth image based rendering (DIBR). Further details will be described in other embodiments.

The pre-capturing module 602, the object sharpness evaluating module 604, the focus varying range determining module 606, the image capturing module 608, the deconvoluting module 610, and the internal buffer 612 included in the image capturing device 600 are typically achieved in the form of integrated circuits (IC), application-specific integrated circuits (ASIC), large scale integrated (LSI) circuits, a digital signal processor (DSP), or achieved by a CPU based processor and machine including a personal computer (PC). Each of these modules may be in a plurality of single-function LSIs or one integrated LSI. The name used here is LSI, but it is also called IC, system LSI, super LSI, or ultra LSI in accordance with the degree of integration. Moreover, ways to achieve integration are not only LSI, but a special circuit or a general purpose processor and so forth can also achieve the integration. This includes a specialized microprocessor such as a digital signal processor (DSP) that can be directed by program instruction. A field programmable gate array (FPGA) that can be programmed after manufacturing LSI or a reconfigurable processor that allows reconfiguration of the connection or configuration of LSI can be used for the same purpose. In the future, with advancement in manufacturing and process technology, a brand-new technology may replace LSI. The integration can be achieved by that technology. In the implementation, the image capturing device 600 may be embedded into an image capturing device such as a digital still camera and a movie camera. The image capturing device 600 may also be implemented in a standalone device to work with an image capturing system in a professional capturing system, for example. The implementation of the image capturing device 600 in other types of device is also possible, which does not limit the scope of the present invention.

FIG. 6B is a flowchart of a depth of field extending process according to an embodiment of the present invention.

First at step S602, the pre-capturing module 602 captures (pre-captures) a scene that is an imaging target at each of different focus positions to output a plurality of pre-captured images. The term "pre-capture" is used here which refers to the process for capturing the scene for pre-computing a focus position varying range (hereinafter referred to as "pre-capturing process"). The images captured in the pre-capturing process are not directly used for constructing an output image. The pre-capturing process may be performed while the camera is in preview mode. For example, for a movie camera, the preview mode is on while the user is pointing the camera to the intended scene. The pre-capturing process may be performed just before the record button is pressed. Typically, the number of images captured in the pre-capturing process is less than 10. This means that the pre-capturing process requires only 330 milliseconds to finish capturing all 10 images, at a normal video rate (30 frames per second). This delay is acceptable because the pre-capturing process is needed only one time for the same scene. Another example is the case of a digital still camera. In this case, the pre-capturing process may be performed just after the user presses the shutter button halfway. This does not cause a delay noticeable to the user.

There are other known processing methods for the above pre-capturing process. Examples include the pre-capturing process performed for the exposure and shutter speed determination function and the autofocus function. It is possible that the present invention utilizes such existing pre-capturing process. Specifically, the pre-capturing process for the autofocus function may be directly used for the present invention. This is because the pre-captured images obtained from the pre-capturing process according to an aspect of the present invention may have different focus points. Other pre-capturing process may also be used. This is not to limit the scope and spirit of the present invention. It is preferable that the resolutions of the pre-captured images obtained from the pre-capturing process be relatively low to allow efficiency in memory storage and in further processing.

The focus position of each image in the pre-capturing process may be effectively varied by directing the actuator to move the image sensor or the imaging lenses or both.

At step S604, the object sharpness evaluating module 604 evaluates object sharpness levels (or blur) of the pre-captured images to obtain images indicating object in-focus levels of the pre-captured images. When an image is pre-captured in the pre-capturing process, the focus position of the image is recorded. Objects at different distances from the image capturing device in the scene appear sharply in-focus in different pre-captured images. For a specific object, it has the maximum sharpness level (maximum in-focus level) in only one pre-captured image. Therefore, by checking the focus position corresponding to a pre-captured image having the maximum sharpness level of an object, the distance from that object to the image capturing device (hereinafter referred to as "object distance") can be computed. Moreover, since an object distance can be computed for each object, computation of relative distances from an object to other objects is also possible.

At step S606, the focus varying range determining module 606 determines a focus position varying range based on the pre-captured images obtained from step S604, such that a signal-to-noise ratio (SNR) of objects in the image of a scene to be captured is maximized. For example, in one embodiment, the start point and the end point of the focus position varying range may be determined using at least two object distances derived from the highest in-focus levels of objects in the images obtained from step S604. The start point and the end point determined in this case correspond to the minimum object distance and the maximum object distance in the scene, respectively. More specifically, the start point and the end point are determined such that one start point is corresponded to the minimum object distance in the scene and one end point is corresponded to a distance within a range between the minimum and maximum object distances in the scene. That is to say, the focus varying range determining module 606 determines a focus position varying range by determining, among the focus positions obtained at step S604, the nearest position as the start point and the farthest position as the end point. Note that the focus varying range determining module 606 may determine a plurality of focus position varying ranges by determining, as the start and end points respectively, the nearest and farthest positions in each of focus position groups which includes, among the focus positions obtained from step S604, a plurality of focus positions satisfying predetermined consecutiveness. In this case, the "focus positions satisfying predetermined consecutiveness" refer to focus positions corresponding to consecutively pre-captured images among, for example, 10 pre-captured images. For instance, in the case where the focus positions obtained from step S604 correspond to the first to third pre-captured images and the seventh to tenth pre-captured images, two focus position ranges are determined as focus position varying ranges; one being a range between the focus positions corresponding to the first to third pre-captured images, and the other being a range between the focus positions corresponding to the seventh to tenth pre-captured images.

At step S608, the image capturing module 608 captures a scene that is an imaging target while varying the focus position during image capturing based on the focus position varying range determined at step S606, and outputs at least one output image. The light signals of objects at both in-focus and out-of-focus positions in the scene are accumulated into pixels in the image sensor 6 (12), forming an output image (convoluted image). Note that in the case of more than one focus position varying range, the focus position varying speed may be set faster to reduce the exposure time in ranges outside the focus position varying ranges, or images may be captured in each of the focus position varying ranges. In the latter case, the number of images captured is the number of focus position varying ranges.

At step S610, the deconvoluting module 610 deconvolutes the image captured (convoluted) at step S608, using at least one point spread function (PSF), to obtain an image having an extended depth of field. Note that in the case where a plurality of focus position varying ranges are set and a plurality of images are thus captured, an image which is the plurality of images convoluted is deconvoluted using a point spread function corresponding to that image to obtain an image having an extended depth of field.

By adaptively determining the focus position varying range based on an object distance in the scene according to the above depth of field extending process, the light signals of all objects at in-focus positions are accumulated (integrated) into pixels. This is to guarantee that high frequency components (referred to the light signals of objects at in-focus positions) of objects in the image of a scene are maximized. Thus, a high-quality image having an extended depth of field can be obtained for various scene types.

Note that a known deconvolution method may be used at step S610. One example of such deconvolution method is "Wiener deconvolution" or "Wiener filter". The details about the method can be found in "Digital Image Processing" of R. C. Gonzalez & R. E. Woods, Addison-Wesley Publishing Company, Inc., 1992 (Non-Patent Literature 2). Another example of the known method is "Lucy-Richardson deconvolution". The details about the method can be found in "Acceleration of Iterative Image Restoration Algorithms" of D. S. C. Biggs, Applied Optics, Vol. 36, No. 8, pp. 1766-1775, 1997 (Non-Patent Literature 3).

The PSF used at step S610 is stored in a memory in advance. The PSF stored in the memory in advance may be pre-computed by calibrating the image capturing device 600. For example, a calibration chart is placed in the scene and captured at different focus positions. The distance between the calibration chart and the image capturing device is adaptively changed when the calibration chart is captured, and a PSF is then computed using calibration data obtained from the calibration chart capturing. Alternatively, a PSF may be computed when an image is captured, by employing a PSF estimation technique. In such a manner, deconvolution such as a blind deconvolution technique is used at step S610.

Figure 7:
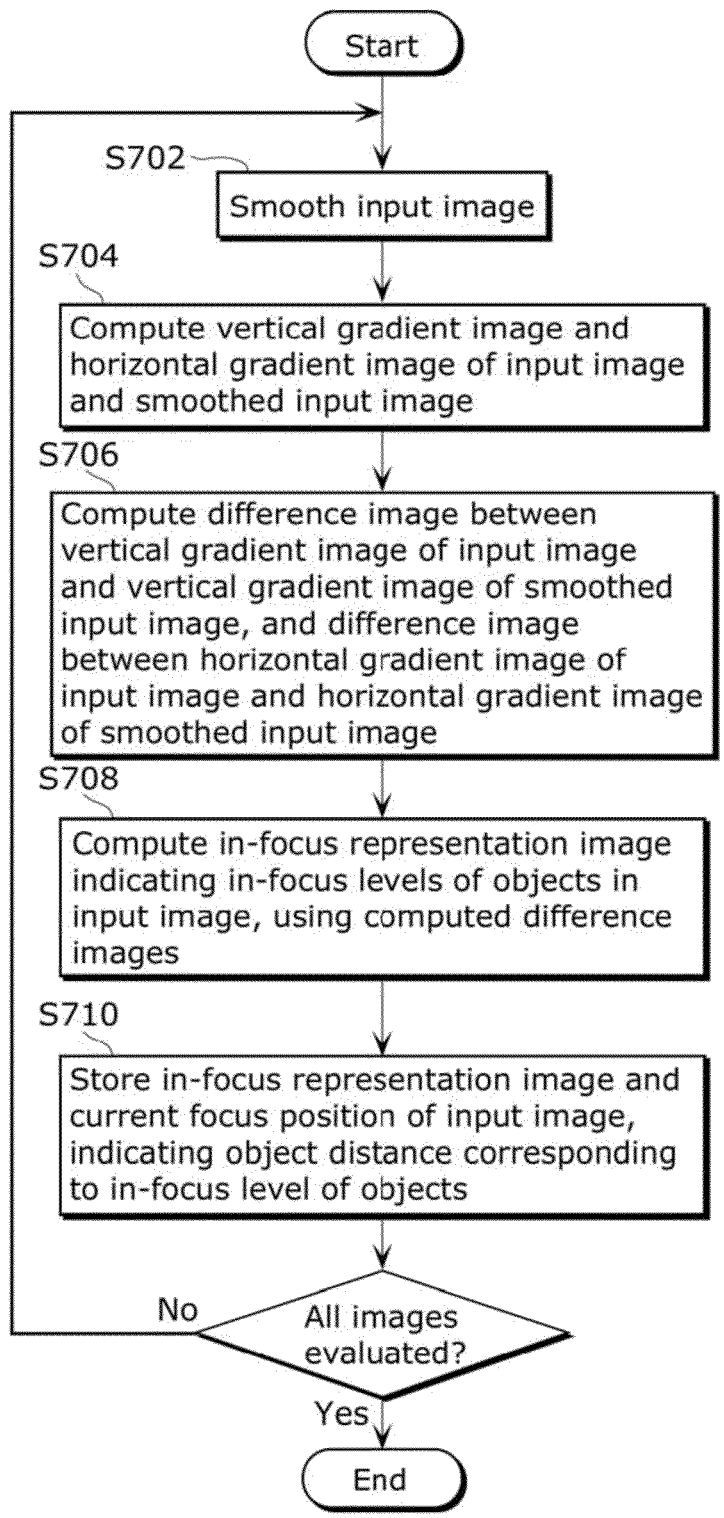
FIG. 7 is a flowchart of a process for evaluating object blur and/or sharpness level according to an embodiment of the present invention.

FIG. 7 is a detailed diagram of an object sharpness evaluation method according to an exemplarily embodiment of the present invention. Specifically, FIG. 7 explains the details of the process at step S604 in the depth of field extending process.

This method starts when the pre-captured images captured at different focus positions at step S602 are outputted. First, at step S702, the object sharpness evaluating module 604 takes in the pre-captured images as input images and smoothes each of the input images.

At step S704, the object sharpness evaluating module 604 computes a vertical gradient image and a horizontal gradient image of an input image and computes a vertical gradient image and a horizontal gradient image of a smoothed input image. At step S706, the object sharpness evaluating module 604 computes a difference image between the vertical gradient images of the input image and the smoothed image, and computes a difference image between the horizontal gradient images of the input image and the smoothed input image. At step S708, the object sharpness evaluating module 604 computes for each of the input images (pre-captured images) an in-focus representation image indicating the in-focus level of the corresponding input image, using the computed difference image of the vertical gradient and the computed difference image of the horizontal gradient, to obtain a resultant image of this step. At step S710, the method stores the focus position and the in-focus representation image computed for the corresponding input image, resulting in indication of the object distance and the object in-focus level of the image. Steps S702 to S710 are repeated until all pre-captured images are evaluated.

Figure 8:
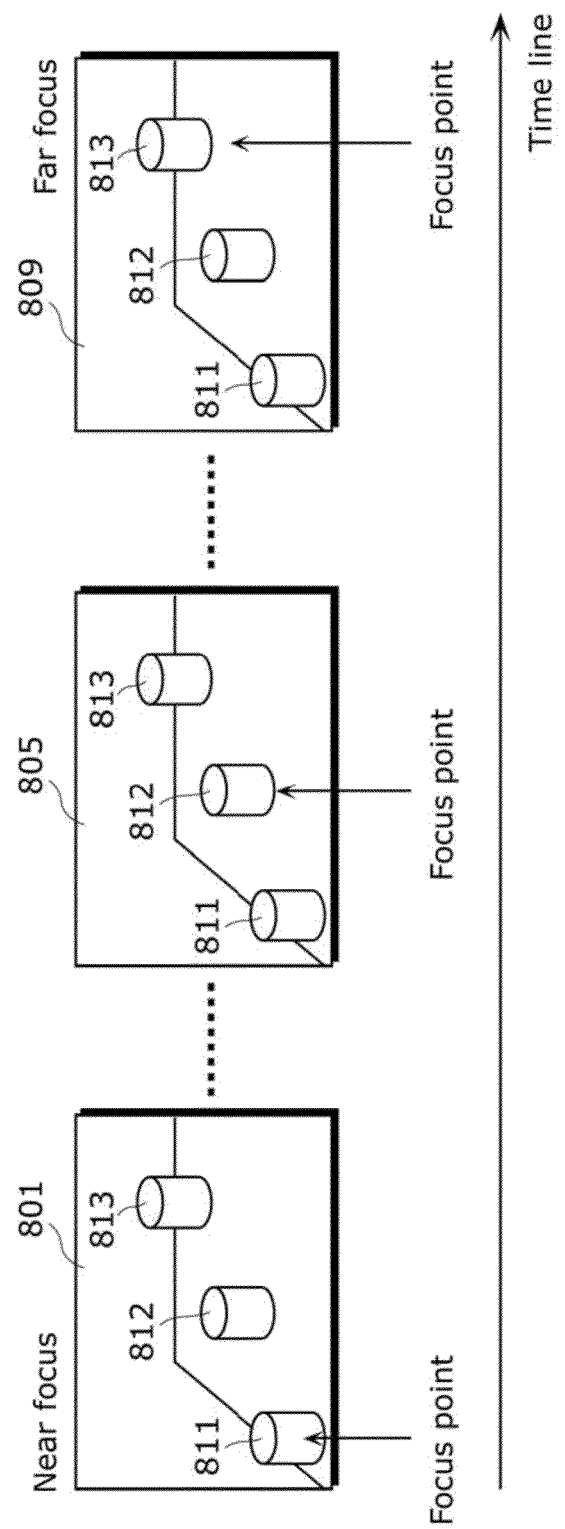
FIG. 8 is an illustrative example of images pre-captured at different focus positions.

FIG. 8 shows an example of pre-captured images captured at different focus positions in the pre-capturing process. For example, the scene is captured at different focus positions, starting from a near focus position to a far focus position. In FIG. 8, an image 801 is captured at the near focus position. The focus point of the image 801 is set at the near object. The focus position is varied with time. An image 805 shows that the focus position is changed to the intermediate position, and the focus point is at the intermediate object. The focus position is then changed to a far focus point. At the far focus position, the focus point is set at the far object as shown in an image 809. After the pre-capturing process, pre-captured images each having a different focus point are obtained.

Figure 9:
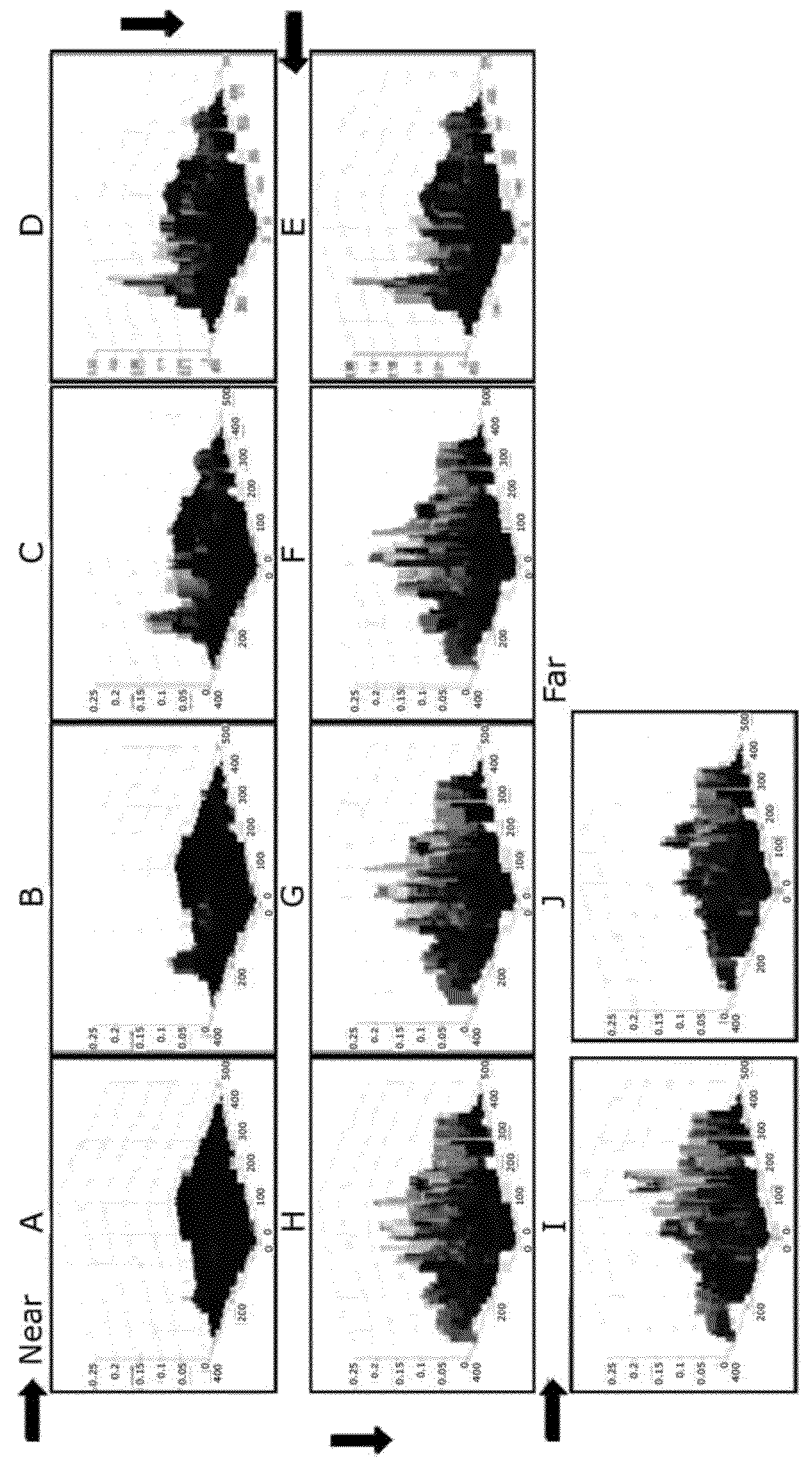
FIG. 9 shows in-focus representation images of the pre-captured images in FIG. 8.

FIG. 9 shows a real example of in-focus level distribution of each of the pre-captured images. These are 10 pre-captured images. An image A is an image captured when the focus position is set at near focus. This focus position is varied from near focus to far focus. An image J is an image captured when the focus position is set at far focus. In FIG. 9, it is shown that the in-focus level is increasing from the image A to an image E. This means that in the image E the nearest object is in-focus. The in-focus level of this image is high and decreasing in an image J. It means that the farthest object is blurring (out of focus) because the in-focus levels of all objects are decreasing. The highest in-focus level of a far object is found in an image I. Therefore, the focus positions of the images E and I can be used for determining a focus position varying range.

Figure 10:
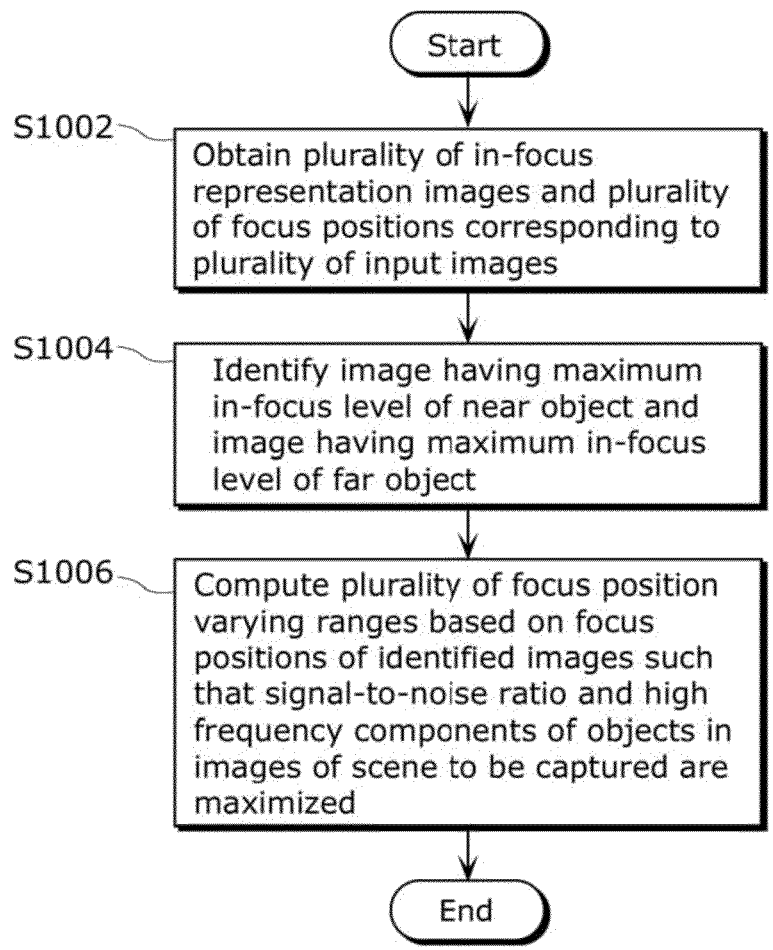
FIG. 10 is a flowchart of a process for determining a focus position varying range according to an embodiment of the present invention.

FIG. 10 is a detailed diagram of a focus varying range determining process according to an embodiment of the present invention. Specifically, FIG. 10 explains the details of the process at step S606 in the depth of field extending process.

This method starts when the object in-focus levels are indicated at step S604. First, at step S1002, the focus varying range determining module 606 obtains a plurality of in-focus level distributions and a plurality of focus positions corresponding to the plurality of input images. At step S1004, the focus varying range determining module 606 identifies a first image having a maximum in-focus level of the nearest object in a scene and identifies a second image having a maximum in-focus level of the farthest object in the scene. At step S1006, the focus varying range determining module 606 computes a focus position varying range based on the focus positions of the identified first and second images such that the signal-to-noise ratio of an output image to be finally outputted is maximized.

Figure 11A:
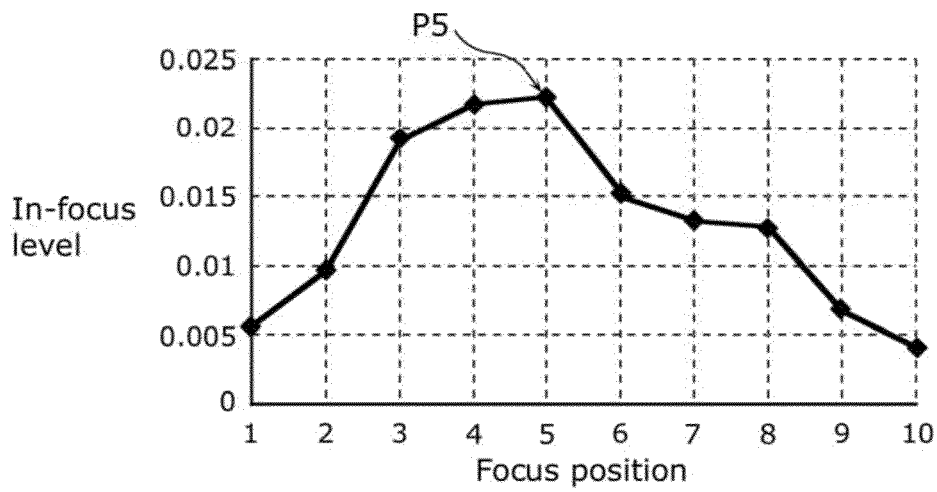
FIG. 11A shows an in-focus level of an object in images having different focus positions.
Figure 11B:
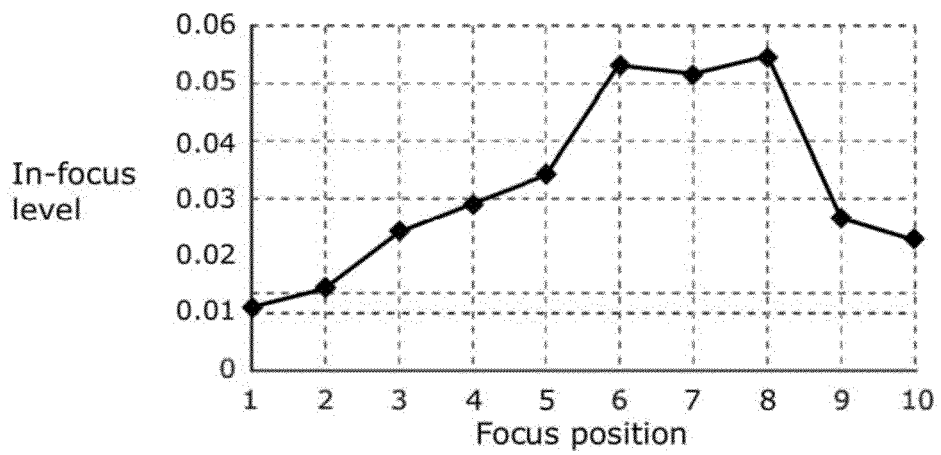
FIG. 11B shows an in-focus level of an object in images having different focus positions.
Figure 11C:
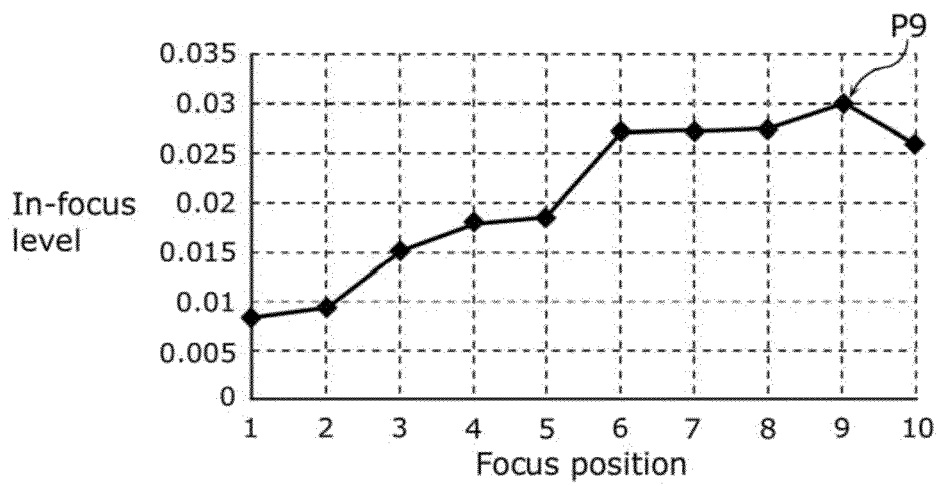
FIG. 11C shows an in-focus level of an object in images having different focus positions.

FIG. 11A to FIG. 11C show examples of in-focus levels of objects in a scene across different focus positions. Note that each focus position shown in FIG. 11A to FIG. 11C represents a nearer position when the number is smaller and a farther position when the number is larger. Specifically, FIG. 11A shows an in-focus level across different focus positions in the case of capturing a first object 811 in FIG. 8. In FIG. 11A, the in-focus level of the object 811 increases from a focus position 1 to a focus position 5 and decreases successively thereafter.

FIG. 11B shows an in-focus level across different focus positions in the case of capturing a second object 812 in FIG. 8. In FIG. 11B, the in-focus level of the object 812 increases from the focus position 1 to a focus position 6, horizontally transits to focus positions 7 and 8, and decreases thereafter. This indicates that FIG. 11B shows the in-focus level corresponding to the intermediate object.

FIG. 11C shows an in-focus level across different focus positions in the case of capturing a third object 813 in FIG. 8. In FIG. 11C, the in-focus level of the object 813 increases from the focus position 1 to a focus position 9, and decreases thereafter. This indicates that FIG. 11C shows the in-focus level corresponding to the far object.

From these examples, the maximum in-focus level of the first object 811, the nearest object, is identified as P5 and the maximum in-focus level of the farthest object is identified as P9. Therefore, a focus position varying range is derived from the focus positions of the pre-captured images corresponding to P5 and P9.

With this, the focus varying range determining module 606 obtains, for each pre-captured image, an in-focus level (sharpness level) of each of regions obtained by dividing each pre-captured image, and obtains, for each region, a focus position corresponding to a pre-captured image having a maximum sharpness level among the in-focus levels (sharpness levels) of the regions obtained for each pre-captured image. The focus varying range determining module 606 then determines the focus position varying range such that the obtained focus positions are included.

Thus, the focus varying range determining module 606 obtains for each region a focus position corresponding to the pre-captured image having the maximum in-focus level (sharpness level), and determines a focus position varying range based on the focus positions obtained. With this, in the case where an object is present in a region obtained by dividing each pre-captured image, the focus position corresponding to that object can be obtained. In other words, because a focus position varying range is determined such that the obtained focus positions are included, it is possible to obtain an image in which each object included in the scene to be captured appears sharply.

Furthermore, the focus varying range determining module 606 may: obtain, for each pre-captured image, an in-focus level (sharpness level) of each of regions obtained by dividing each pre-captured image; obtain a plurality of focus positions at which pre-captured images having, among the obtained in-focus levels of the pre-captured images and the regions, sharpness levels higher than a predetermined threshold have been captured; and determine the focus position varying range such that the obtained focus positions are included.

With this, the focus varying range determining module obtains, for each pre-captured image, an in-focus level (sharpness level) of each of regions obtained by dividing each pre-captured image, and obtains a plurality of focus positions at which pre-captured images having, among the in-focus levels (sharpness levels) obtained for each pre-captured image and each region, in-focus levels (sharpness levels) higher than a predetermined threshold have been captured. Then, the focus varying range determining module determines a focus position varying range such that the obtained focus positions are included.

With this, the focus position varying range is determined such that the range includes the focus positions at which the pre-captured images having in-focus levels (sharpness levels) higher than at least a predetermined threshold have been captured. More specifically, since the focus positions corresponding to the objects having higher in-focus levels (sharpness levels) can be obtained, a range, in the scene to be captured, in which an image can be captured with a higher in-focus level (sharpness level) can be set as the focus position varying range. As a result, a sharp image can be obtained.

Figure 12:
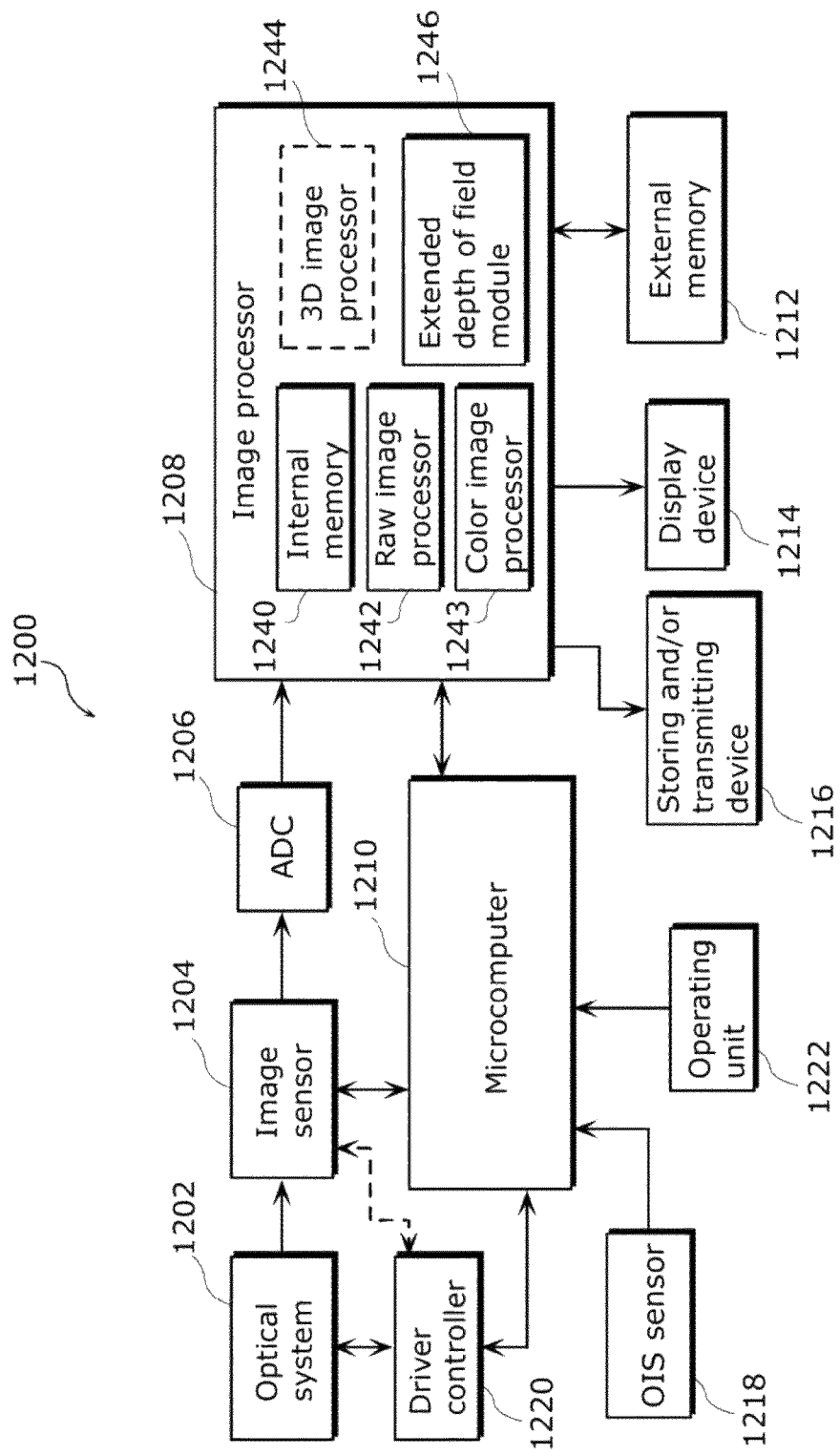
FIG. 12 is an illustrative example of an image capturing device according to an embodiment of the present invention.

FIG. 12 is a schematic block diagram of hardware of an image capturing device 600 according to an embodiment of the present invention. The image capturing device 600 includes an optical system 1202, an image sensor 1204, an analog-to-digital converter (ADC) 1206, an image processor 1208, a microcomputer 1210, an external memory 1212, a driver controller 1220, an optical image stabilizer (OIS) sensor 1218, an operating unit 1222, a storing and/or transmitting device 1216, and a display device 1214. The image processor 1208 includes an internal memory 1240, an extended depth of field module 1246, a raw image processor 1242, a color image processor 1243, and optionally a 3D image processor 1244. Other structural elements such as a microphone, a speaker, and so on are not shown, but this does not limit the scope and spirit of the present invention.

The optical system 1202 may include structural elements such as lenses or a set of lenses, a zoom/focus mechanism, an actuator, a shutter, an aperture, and so on, for controlling the light signal reaching the image sensor 1204.

The image sensor 1204 accumulates the incoming light collected by the optical system 1202 and converts the light into an electrical signal. The image sensor 1204 is controlled by the microcomputer 1210. The electrical signal generated by the image sensor 1204 is converted into digital data (raw image data) by the ADC 1206 and stored in the internal memory 1240 or the external memory 1212. The raw image data includes a set of pre-captured images each of which is taken at a different focus position. In addition, the raw image data includes an image higher in resolution than the pre-captured images. The image higher in resolution than the pre-captured images is the raw image data convoluted with images captured at different focus positions while the focus position is varied during image capturing.

The raw image processor 1242 takes in the raw image data from the internal memory 1240 (or the external memory 1212) and may perform many pre-processes (not shown), such as resizing, linearity correction, white balance, and gamma correction. This pre-processed raw image data may be stored or transmitted by the storing and/or transmitting device 1216. The pre-processed raw image data can also be processed by the color image processor 1243 to generate a color image, such as RGB or YCbCr. The color image processor 1243 performs such processing as color interpolation, color correction, tonal range adjustment, and color noise reduction, for generating a favorable color image. The extended depth of field module 1246 takes in the pre-captured images and directs the microcomputer 1210 to drive the imaging lenses or image sensor for varying the focus position during image capturing. The captured image is then inputted to the extended depth of field module 1246 and an extended depth of field image (referred to as "all-in-focus (AIF) image") is generated. The output AIF image may be used for viewing on the display device 1214 and may also be stored in the storing and/or transmitting device 1216. Examples of a storage device in the storing and/or transmitting device 1216 include, but are not limited to, a flash-based memory card, a hard drive, and an optical drive. Examples of a transmission device in the storing and/or transmitting device 1216 include, but are not limited to, an HDMI interface, a USB interface, a wireless interface, and a direct-to-printer interface. The data processed by the storing and/or transmitting device 1216 may optionally undergo lossless or lossy compression. Furthermore, the output AIF image may be used in the further processing module such as the 3D image processor 1244. The AIF image may be used for depth estimation and 3D image generation. The details thereof will be described in the next embodiment.

The optical system 1202 may be controlled by the driver controller 1220 which is controlled by the microcomputer 1210. The operating unit 1222 receives user operation input and sends an electrical signal to the microcomputer 1210 to control the related modules such as the driver controller 1220, the image sensor 1204, and the image processor 1208 that correspond to the user input. The OIS sensor 1218 detects a motion caused by hand shaking or camera motion and sends an electrical signal to the microcomputer 1210. The microcomputer 1210 directs the driver controller 1220 to control an actuator or the like in the optical system 1202 so that the actuator moves the lenses to compensate for the motion via the driver controller 1220, thus reducing motion blur effect caused by hand shaking or camera motion.

The image processor 1208 may send a first electrical signal provided by the extended depth of field module 1246, to the microcomputer 1210. The microcomputer 1210 directs the driver controller 1220 to control an actuator or the like in the optical system 1202 so that the focus position of each image is varied during the pre-capturing process.

The image processor 1208 may send a second electrical signal provided by the extended depth of field module 1246, to the microcomputer 1210. The microcomputer 1210 directs the driver controller 1220 to control an actuator or the like in the optical system 1202 so that the actuator moves the lenses for motion compensation and the focus position is varied during the pre-capturing process, thereby forming a convoluted image to be inputted to the extended depth of field module 1246 for generation of an extended depth of field image.

Note that the extended depth of field module 1246 is hardware for achieving the function indicated by the image capturing device 600 in the previous embodiments.

The image processor 1208, the extended depth of field module 1246, and the modules therein are typically achieved in the form of integrated circuits (IC), application-specific integrated circuits (ASIC), or large scale integrated (LSI) circuits. Each of these modules may be in a plurality of single-function LSIs or in one integrated LSI. The name used here is LSI, but it is also called IC, system LSI, super LSI, or ultra LSI in accordance with the degree of integration. Moreover, ways to achieve integration are not only LSI, but a special circuit or a general purpose processor and so forth can also achieve the integration. This includes a specialized microprocessor such as a digital signal processor (DSP) that can be directed by program instruction. A field programmable gate array (FPGA) that can be programmed after manufacturing LSI or a reconfigurable processor that allows reconfiguration of the connection or configuration of LSI can be used. In the future, with advancement in manufacturing and process technology, a brand-new technology may replace LSI. The integration can be achieved by that technology.

With the image capturing device 600 according to the present embodiment, the pre-capturing module 602 obtains, before the imaging target is actually captured to generate an output image, pre-captured images by capturing the imaging target plural times, each time with a different focus position. The object sharpness evaluating module 604 then evaluates the sharpness levels of the pre-captured images. Thus, since the object sharpness evaluating module 604 evaluates in advance the sharpness levels of the pre-captured images captured at the plural focus positions, the position, relative to the image capturing device, of an object in the scene which is the imaging target can be known. With this, the focus varying range determining module 606 can automatically determine a focus position varying range such that the range includes the focus position of each object at which the object can be captured sharply in the scene to be captured, for example.

As described, since, prior to actual image capturing, a focus position varying range is automatically determined according to the scene to be captured, it is unnecessary for the user to manually adjust the focus position varying range to suit the scene. This allows the user to easily operate the image capturing device with less confusion about how to operate the device. Therefore, a high-quality, sharp, and clear image with an extended depth of field can be obtained for various scene types even when the position, relative to the image capturing device 600, of an object in the scene to be captured is unknown.

Moreover, the pre-captured images obtained to determine a focus position varying range are lower in resolution than an output image, and thus fewer high resolution images need to be used and stored. Therefore, fewer memories are required than the conventional technique disclosed in Patent Literature 1. Moreover, the present invention has shorter time lags and is capable of real-time applications.

Figure 13:
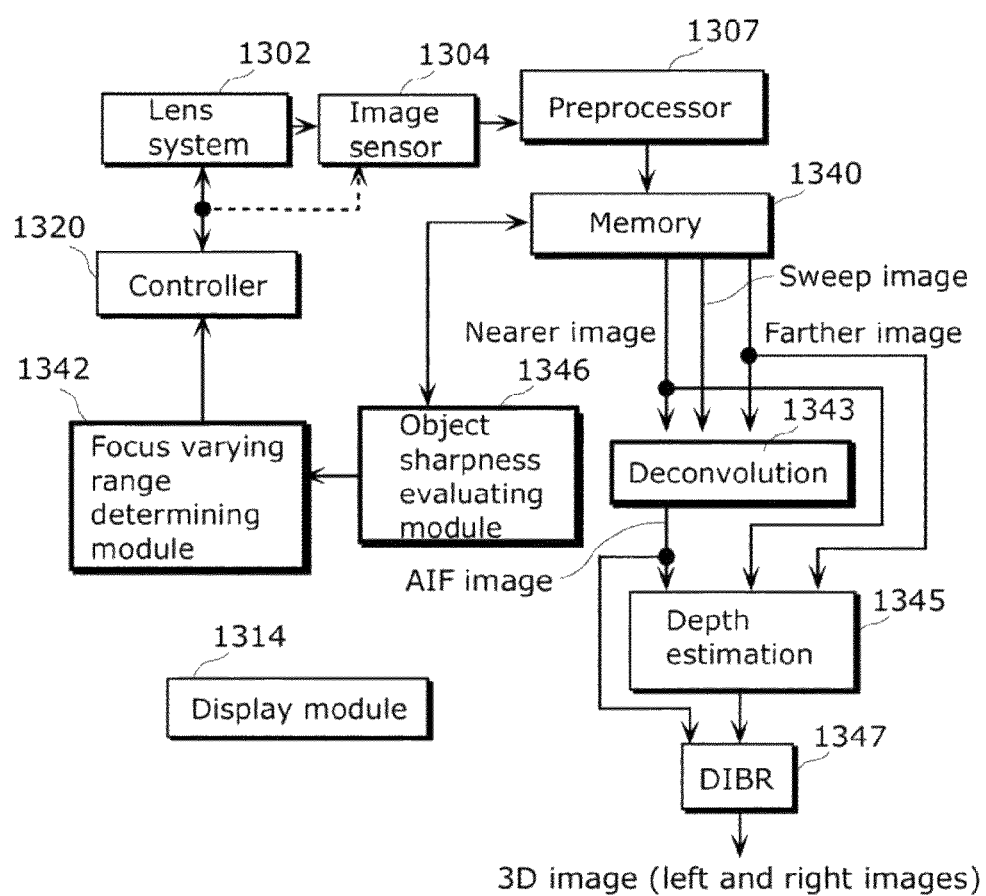
FIG. 13 shows an image capturing device according to an embodiment of the present invention.

FIG. 13 is an exemplarily block diagram of a depth of field extending device 1300 which includes an image capturing device according to an embodiment of the present invention. In this embodiment, the details of the depth of field extending device 1300 will be described in the application on 3D (left and right) image generation, by way of illustrative example. The depth of field extending device 1300 pre-captures a plurality of images of a scene to be captured, and stores the pre-captured images in a memory 1340. Each of the pre-captured images is taken at a different focus position. Therefore, objects located in different pre-captured images each have a sharpness level different from one another. A controller 1320 directs an actuator (not shown) to move at least one of a lens system 1302 and an image sensor 1304 for varying the focus positions of images in the pre-capturing process. An object sharpness evaluating module 1346 takes in the plurality of images from the memory 1340 and evaluates the object blur and/or sharpness level of each image to obtain data indicating an object distance and an object in-focus level corresponding to an object in the image. The object sharpness evaluating module 1346 may store the obtained data in the memory 1340, and may also send the obtained data to a focus varying range determining module 1342. The focus varying range determining module 1342 takes in the obtained data and determines a focus position varying range. More specifically, the focus varying range determining module 1342 determines the start point and the end point of a focus position varying range based on the obtained data by taking into consideration the highest in-focus level obtained for a near object and the highest in-focus level obtained for a far object. The focus varying range determining module 1342 derives the start point of the focus position varying range from the focus position of a pre-captured image having the highest in-focus level of the near object, and derives the end point of the focus position varying range from the focus position of a pre-captured image having the highest in-focus level of the far object. This means that the image of the scene to be captured while at least one of the lens system 1302 and the image sensor 1304 is moved according to this focus position varying range contains the highest in-focus levels of all near and far objects. Therefore, the image captured while the focus position is varied within this determined range is an image convoluted with images in which all objects appear with the maximum sharpness levels.

Referring to FIG. 13, the focus varying range determining module 1342 sends an electrical signal indicating the focus position varying range to the controller 1320. The controller 1320 directs the actuator to vary the focus position during image capturing, based on the electrical signal indicating the focus position varying range. The depth of field extending device 1300 captures at least one image while varying the focus position and stores the captured image in the memory 1340. A deconvoluting module 1343 takes in the captured image stored in the memory 1340 and deconvolutes that image using at least one predetermined point spread function (PSF) to obtain an AIF image. The depth of field extending device 1300 may further capture additional near-focus image and far-focus image. Optionally, the near-focus and far-focus images may be used in the deconvoluting module 1343. The AIF image may be used for viewing as an image (in 2D) with an enhanced depth of field. The AIF image, the near-focus image, and the far-focus image may be used in a depth estimating module 1345. The depth estimating module 1345 estimates a depth map using Advanced-Depth from Defocus (A-DFD) technique. The estimated depth map and the AIF image are inputted to a Depth Image Based Rendering (DIBR) module 1347. The DIBR module 1347 generates stereoscopic left and right images which can be used for 3D viewing.

In one embodiment, the focus position varying range may be determined adaptively based on the scene to be captured. For example, the focus position varying range for capturing the scene containing objects at distance from 1.0 meter to 2.5 meters may be smaller than the focus position varying range for capturing the scene containing objects at distance from 1.0 meter to 10 meters. According to the following thin lens equation:

[Math. 1]

$$\frac{1}{f} = \frac{1}{u} + \frac{1}{v}$$ (Expression 1)

where, in (Expression 1), f is the focal length of the imaging system in the depth of field extending device 1300, u is the distance between an object in the scene and the imaging lens, v is the distance between the imaging lens and the image plane in which an object at distance u appears sharply in-focus. For example, when the imaging system having a focal length f=18 mm is focusing on an object at the distance of 1.0 meter, the distance between the imaging lens and the image plane in which the object appears in-focus can be computed as shown in (Expression 2) and (Expression 3) below.

[Math. 2]

$$\frac{1}{18} = \frac{1}{1000} + \frac{1}{v}$$ (Expression 2)

[Math. 3]

$$v = 1 \bigg/ \left(\frac{1}{18} - \frac{1}{1000}\right) = 18.3299 \text{ mm}$$ (Expression 3)

When this imaging system is focusing on the object at the distance of 2.5 meters, the distance between the imaging lens and the image plane in which the object appears in-focus is v=18.1305 mm. Therefore, in this example, the focus position varying range for capturing the scene containing objects at distance from 1.0 meter to 2.5 meters is set to a range from 18.3299 mm to 18.1305 mm, for example. In this case, the actuator is directed to move the imaging lens or the image sensor with the distance of 199.4 um, for example. In the case where the above imaging system is focusing on the object at the distance of 10.0 meters, the distance between the imaging lens and the image plane in which the object appears in-focus is v=18.0324 mm. Therefore, in this example, the focus position varying range for capturing the scene containing objects at distance from 1.0 meter to 10.0 meters is set to a range from 18.3299 mm to 18.0324 mm. In this case, the actuator is directed to move the imaging lens or the image sensor with the distance of 297.5 um, for example.

By doing this adaptively, the in-focus levels of objects (at focus point) in the image captured (while the focus position is varied) are maximized. In addition, the signal-to-noise ratio of the objects is also maximized especially for the image of the scene containing only relatively near objects, because the focus position varying range is smaller.

Figure 16A:
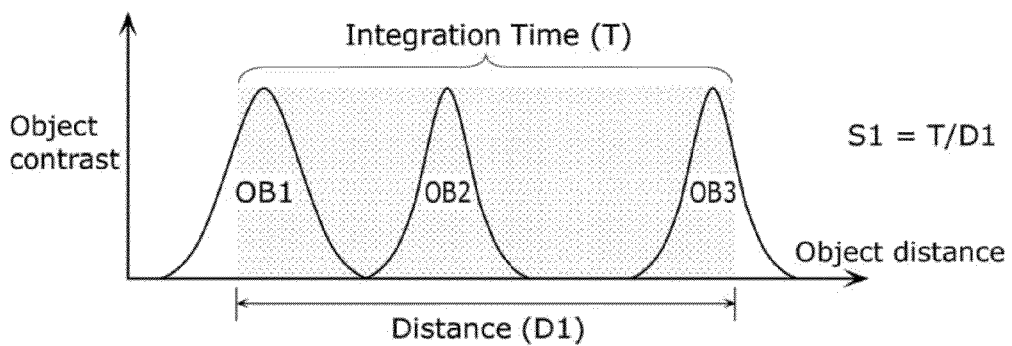
FIG. 16A shows integrations of high frequency components of objects within a given exposure time of different focus sweep ranges.
Figure 16B:
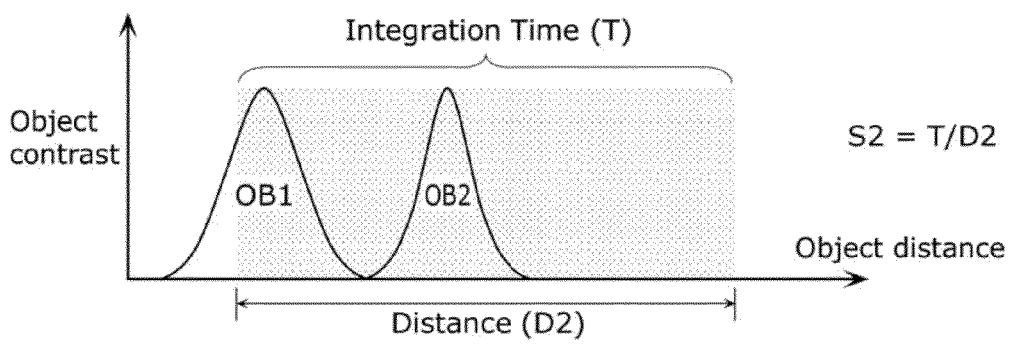
FIG. 16B shows integrations of high frequency components of objects within a given exposure time of different focus sweep ranges.
Figure 16C:
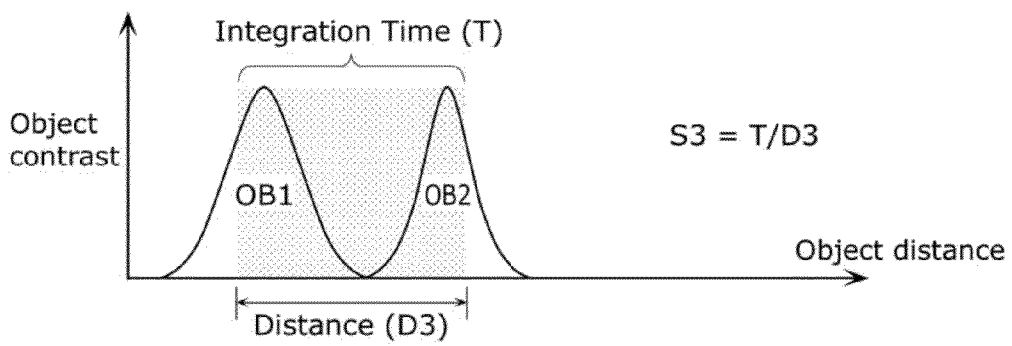
FIG. 16C shows integrations of high frequency components of objects within a given exposure time of different focus sweep ranges.

FIGS. 16A to 16C show computation, through integrations of contrast, of object in-focus levels within a given exposure time of different focus sweep (varying) ranges. In FIG. 16A, the scene contains an object OB1 (relatively close to the camera), an object OB2 (at the center), and an object OB3 (relatively far from the camera). The focus position varying range is set such that maximum in-focus points (maximum contrast) of the objects OB1, OB2, and OB3 are integrated. The range corresponds to a distance D1. The amount of time for integrating light signals of the objects at the respective positions is computed as [Integration Time (T)/Distance (D1)], for example. In FIG. 16B, the scene contains only the object OB1 (relatively close to the camera) and the object OB2 (at the center). When the focus position varying range is predefined as is conventionally, it is set similarly to D1, which is however not proper. As shown in FIG. 16B, the amount of time for integrating the light signals of the objects at the respective positions is computed as [Integration Time (T)/Distance (D2)], and D2=D1. This however is not proper because there is no object after the object OB2. It is unnecessary to include such range having no object after the object OB2 into the focus position varying range. In FIG. 16C, the scene contains only the object OB1 (relatively close to the camera) and the object OB2 (at the center) as in the case of FIG. 16B. However, the focus position varying range is changed and is smaller. This is because only the light signals from the highest in-focus position of the object OB1 to the highest in-focus position of the object OB2 are integrated. The amount of time for integrating the light signals of the objects at the respective positions is [Integration Time (T)/Distance (D3)]>[Integration Time (T)/Distance (D2)]. More specifically, in the case of capturing the scene including only the objects OB1 and OB2, a plurality of images are pre-captured to obtain object contrasts corresponding to different focal lengths, and thus a range excluding an object distance beyond the object OB2 is automatically set as the focus position varying range. As described, since the focus position varying range can be set according to the range in which objects are present, the signal-to-noise ratio at the in-focus positions of the objects in the captured image is maximized.

In one embodiment, the focus position varying range is limited by the movement speed of the actuator. For example, when the maximum movement speed of the actuator is 43 mm/second, the maximum range limit for video frame rate (30 frames per second) is 43/30=1.433 mm.

In one embodiment, the exposure time of the imaging system may be adjusted based on the determined focus position varying range. This is effective for still pictures. For example, when the initial exposure time is set as ⅛ seconds, the determined range is 4.3 mm, and the actuator moves with the maximum speed of 43 mm/second, the exposure time for this range may be adjusted to ¹⁄₁₀ seconds. On the other hand, the movement speed of the actuator may be adjusted to match with the exposure time. In this example, the movement speed of the actuator may be adjusted to 34.4 mm/second.

Moreover, the exposure time may be adjusted according to the size of the focus position varying range so as to prevent pixel saturation. In this case, an imaging target can be captured with as many light signals as possible. In other words, a shape, high-quality, and clear image can be obtained. Furthermore, the focus position varying range may be limited according to a predetermined exposure time. This is effective when the amount of light is large, for example.

By capturing the image of a scene while varying the focus position during image capturing according to an aspect of the present invention, the image quality of the output AIF image is improved. When the output AIF image is used for viewing (2D viewing), sharper and clearer objects can be seen. When the output AIF image is used for depth estimation (1345), the accuracy of the estimated depth map is improved. When the output AIF image is used for 3D image generation, a sharp and clear 3D image can be obtained and the 3D viewing effect is improved.

Figure 14:
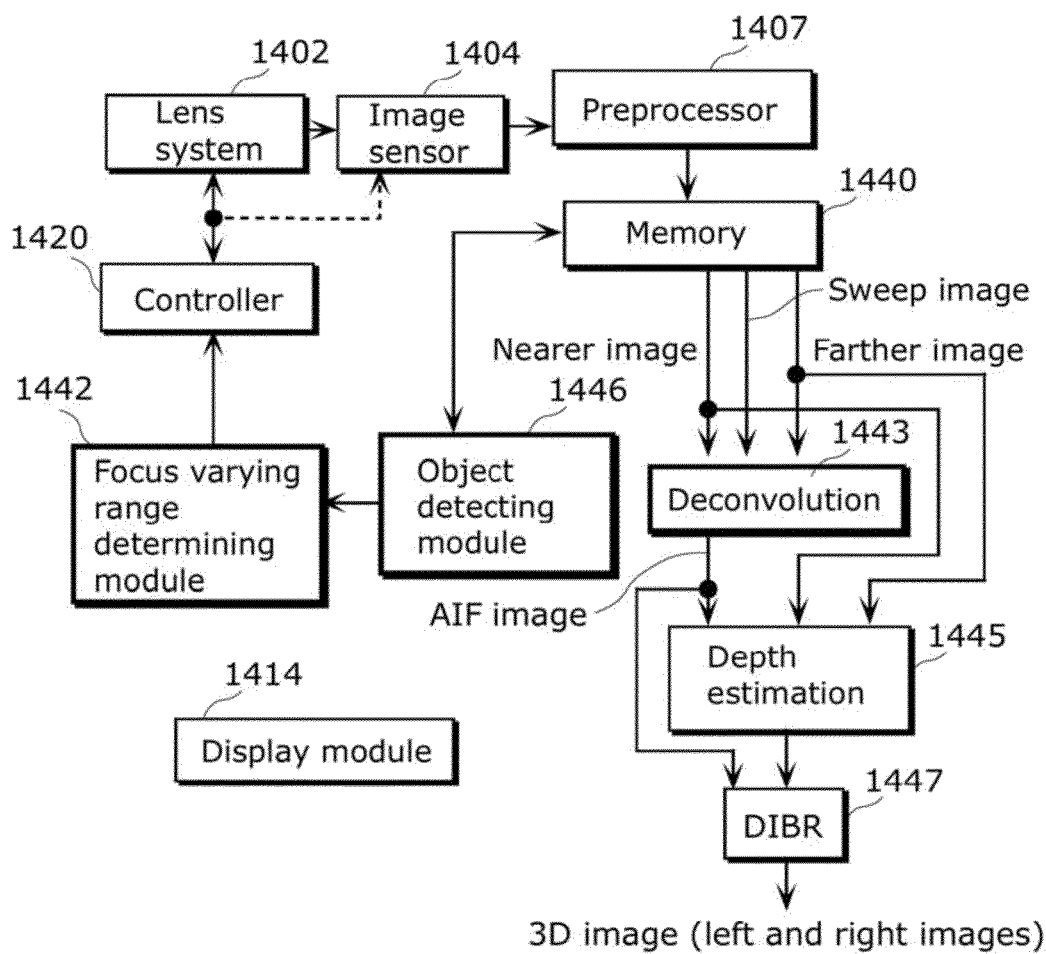
FIG. 14 shows an image capturing device according to another embodiment of the present invention.

FIG. 14 is a block diagram of an image capturing device 1400 according to another embodiment of the present invention. The difference between this embodiment and the embodiment in FIG. 13 is that an object detecting module 1446 is used. The object detecting module 1446, functioning as an object detecting unit, detects an object such as face in a scene to be captured as an imaging target. Furthermore, the object detecting module 1446, functioning also as an object region identifying unit, identifies, based on the detected object such as face, a range of interest (ROI) as an object region that is a partial region of an image obtained by capturing the imaging target in a way that the detected object is at the center of the image. ROI data related to the identified range of interest may be sent to a focus varying range determining module 1442. The focus varying range determining module 1442 determines the focus position varying range based on the ROI data such that the signal-to-noise ratio of the objects detected in the image of the scene to be captured is maximized. The focus varying range determining module 1442 sends an electrical signal indicating the focus position varying range to a controller 1420. The controller 1420 directs the actuator to vary the focus position during image capturing. The image capturing device 1400 captures at least one image while varying the focus position and stores the image in a memory 1424. A deconvoluting module 1443 takes in and deconvolutes the captured image to obtain an output AIF image. The image capturing device 1400 may further capture additional near-focus image and far-focus image. Optionally, the near-focus and far-focus images may be used in the deconvoluting module 1443. The AIF image may be used for viewing as an image (in 2D) with an enhanced depth of field. The AIF image, the near-focus image, and the far-focus image may be used in a depth estimating module 1445. The depth estimating module 1445 estimates a depth map using Advanced-Depth from Defocus (A-DFD) technique. The estimated depth map and the AIF image are inputted to a Depth Image Based Rendering (DIBR) module 1447. The DIBR module 1447 generates stereoscopic left and right images which can be used for 3D viewing.

As described, identification of the object region as the range of interest (ROI) enables evaluation of pre-captured images focusing on the ROI, thereby allowing the focus varying range determining module 1442 to determine the focus position varying range. This decreases the data amount required for the evaluation, thereby reducing the time required for determining the focus position varying range.

Figure 15:
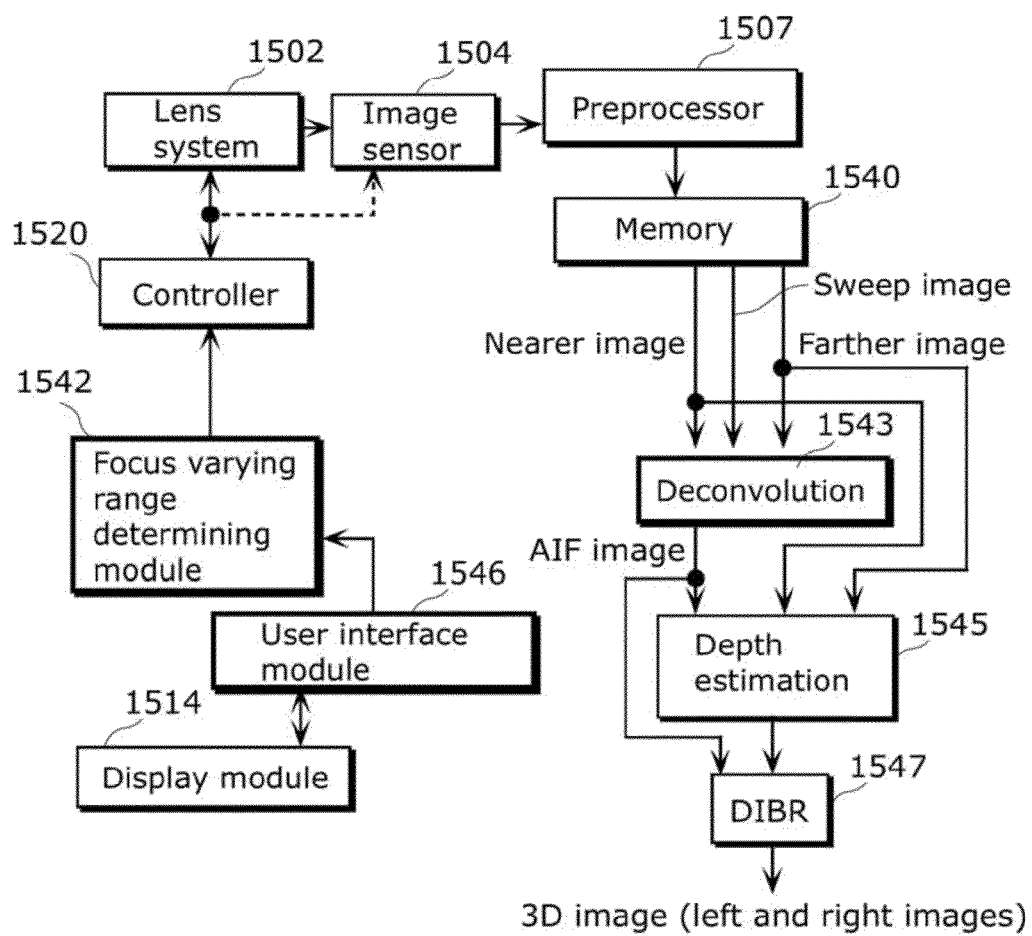
FIG. 15 shows an image capturing device according to another embodiment of the present invention.

FIG. 15 is a block diagram of an image capturing device 1500 according to another embodiment of the present invention. The difference between this embodiment and the embodiment in FIG. 13 is that a user interface module 1546 is incorporated. The user interface module 1546, functioning as a selection receiving unit, receives, as an object of interest (OOI), user's selection of a region of an imaging target in which an object is to be captured. Such selection is given via a user interaction device such as a touch screen display device provided in a display module 1514. The user interface module 1546, also functioning as an object region identifying unit, identifies a range of interest (ROI) in the scene based on OOI data related to the received OOI, such that the OOI is at the center of the ROI. ROI data related to the identified ROI is sent to a focus varying range determining module 1542. The focus varying range determining module 1542 determines a focus position varying range based on the ROI data, such that a signal-to-noise ratio of the OOI detected in the image of the scene to be captured is maximized. The focus varying range determining module 1542 sends an electrical signal indicating the focus position varying range to a controller 1520. The controller 1520 directs the actuator to vary the focus position during image capturing. The image capturing device 1500 captures at least one image while varying the focus position and stores the image in a memory 1524. A deconvoluting module 1543 takes in and deconvolutes the captured image to obtain an output AIF image. The image capturing device 1500 may further capture additional near-focus image and far-focus image. Optionally, the near-focus and far-focus images may be used in the deconvoluting module 1543. The AIF image may be used for viewing as an image (in 2D) with an enhanced depth of field. The AIF image, the near-focus image, and the far-focus image may be used in a depth estimating module 1545. The depth estimating module 1545 estimates a depth map using Advanced-Depth from Defocus (A-DFD) technique. The estimated depth map and the AIF image are inputted to a Depth Image Based Rendering (DIBR) module 1547. The DIBR module 1547 generates stereoscopic left and right images which can be used for 3D viewing.

With this, an image with a high sharpness level for at least the object of the user's interest can be obtained because the object region (range of interest) is recognized based on the object of interest (OOI) that is information given by the user.

The present invention is useful as an image capturing device and so on that is efficient, uses less memory, has no significant time lag, capable of real-time operation, and capable of automatically producing a sharp image for various scene types even when the scene to be captured is unknown and unpredictable.

REFERENCE SIGNS LIST

600 Image capturing device
602 Pre-capturing module
604 Object sharpness evaluating module
606 Focus varying range determining module
608 Image capturing module
610 Deconvoluting module
612 Internal buffer
801 Image
805 Image
809 Image
811 First object
812 Second object
813 Third object
1202 Optical system
1204 Image sensor
1206 ADC
1208 Image processor
1210 Microcomputer
1212 External memory
1214 Display device
1216 Storing and/or transmitting device
1218 OIS sensor
1220 Driver controller
1222 Operating unit
1240 Internal memory
1242 Raw image processor
1243 Color image processor
1244 3D image processor
1246 Extended depth of field module
1300 Depth of field extending device
1302 Lens system
1304 Image sensor
1320 Controller
1340 Memory
1342 Focus varying range determining module
1343 Deconvoluting module
1345 Estimating module
1346 Object sharpness evaluating module
1347 Module
1400 Image capturing device
1420 Controller
1424 Memory
1442 Focus varying range determining module
1443 Deconvoluting module
1445 Estimating module
1446 Object detecting module
1447 DIBR module
1500 Image capturing device
1514 Display module
1520 Controller
1524 Memory
1542 Focus varying range determining module
1543 Deconvoluting module
1545 Estimating module
1546 User interface module
1547 DIBR module

The invention claimed is:

1. An image capturing device which captures an imaging target while varying a focus position and outputs at least one output image as a capturing result, the image capturing device comprising:

a pre-capturing unit configured to capture the imaging target at each of different focus positions in a predetermined focus range and output, as a capturing result, a plurality of pre-captured images lower in resolution than the output image;

a sharpness level computing unit configured to compute a sharpness level of each of the pre-captured images captured by the pre-capturing unit;

a focus varying range determining unit configured to determine a focus position varying range within the predetermined focus range based on sharpness levels computed by the sharpness level computing unit, such that a signal-to-noise ratio of the output image is greater than or equal to a predetermined threshold;

an image capturing unit configured to capture the imaging target by sweeping a lens and varying the focus position during exposure according to the focus position varying range determined by the focus varying range determining unit, and output the at least one output image as a capturing result; and an extended depth of field image deriving unit configured to derive an extended depth of field image having an extended depth of field, using the at least one output image outputted by the image capturing unit and at least one predetermined point spread function;

wherein the focus varying range determining unit is configured to:
divide each pre-captured image into regions;
obtain, for each pre-captured image, an in-focus level that corresponds to a sharpness level of each of the regions;
compare the in-focus levels between corresponding regions in respective pre-captured images;
obtain, for each region, a focus position corresponding to a pre-captured image having a highest in-focus level among the in-focus levels of the regions obtained for each pre-captured image; and
determine the focus position varying range such that the obtained focus positions are included.

2. The image capturing device according to claim 1,
wherein the focus varying range determining unit is configured to determine the focus position varying range by determining, among the obtained focus positions, a nearest position as a start point and a farthest position as an end point.

3. The image capturing device according to claim 1,
wherein the focus varying range determining unit is configured to determine a plurality of focus position varying ranges by determining, in each of focus position groups, a nearest position as a start point and a farthest position as an end point, the focus position groups each including, among the obtained focus positions, focus positions satisfying predetermined consecutiveness.

4. The image capturing device according to claim 1,
wherein the image capturing unit is configured to:
adjust an exposure time based on a size of the determined focus position varying range so as to prevent saturation of pixels of an image to be captured; and
capture the imaging target within the adjusted exposure time while varying the focus position according to the focus position varying range.

5. The image capturing device according to claim 1,
wherein the focus position varying range is limited by a predetermined exposure time.

6. The image capturing device according to claim 1, further comprising:
an object detecting unit configured to detect an object in the imaging target; and an object region identifying unit configured to identify, based on the detected object, an object region that is a partial region of an image obtained by capturing the imaging target such that the detected object is at a center of the image.

7. The image capturing device according to claim 6, further comprising
a selection receiving unit configured to receive, from a user, selection of a region of the imaging target in which an object into be captured,
wherein the object region identifying unit is configured to identify the object region based on the selection of the region received by the selection receiving unit.

8. An image capturing method for capturing an imaging target while varying a focus position and for outputting at least one output image, the image capturing method comprising:
pre-capturing the imaging target at each of different focus positions and obtaining a plurality of pre-captured images lower in resolution than the output image;
computing a sharpness level of each of the pre-captured images captured in the pre-capturing;
determining a focus position varying range based on sharpness levels computed in the computing;
capturing the imaging target by sweeping a lens and varying the focus position during exposure according to the focus position varying range determined in the determining, and outputting the at least one output image; and
deriving an extended depth of field image having an extended depth of field, using the at least one output image outputted and at least one predetermined point spread function,
wherein the determining of the focus position varying range includes:
dividing each pre-captured image into regions;
obtaining, for each pre-captured image, an in-focus level that corresponds to a sharpness level of each of the regions;
comparing the in-focus levels between corresponding regions of the respective pre-captured images;
obtaining, for each region, a focus position corresponding to a pre-captured image having a highest in-focus level among the in-focus levels of the regions obtained for each pre-captured image; and
determining the focus position varying range such that the obtained focus positions are included.

9. A non-transitory computer-readable recording medium for use in a computer, the recording medium having a computer program recorded thereon for causing the computer to execute the image capturing method according to claim 8.

10. An integrated circuit which captures an imaging target while varying a focus position and outputs at least one output image, the integrated circuit comprising:
a pre-capturing unit which captures the imaging target at each of different focus positions and outputs a plurality of pre-captured images lower in resolution than the output image;
a sharpness level computing unit which computes a sharpness level of each of the pre-captured images captured by the pre-capturing unit;
a focus varying range determining unit which determines a focus position varying range based on sharpness levels computed by the sharpness level computing unit;
an image capturing unit which captures the imaging target by sweeping a lens and varying the focus position during exposure according to the focus position varying range determined by the focus varying range determining unit, and outputs the at least one output image; and
an extended depth of field image deriving unit configured to derive an extended depth of field image having an extended depth of field, using the at least one output image outputted by
the image capturing unit and at least one predetermined point spread function,
wherein the focus varying range determining unit is configured to:
divide each pre-captured image into regions;
obtain, for each pre-captured image, an in-focus level that corresponds to a sharpness level of each of the regions;
compare the in-focus levels between corresponding regions of the respective pre-captured images;
obtain, for each region, a focus position corresponding to a pre-captured image having a highest in-focus level among the in-focus levels of the regions obtained for each pre-captured image; and
determine the focus position varying range such that the obtained focus positions are included.

* * * * *